US008035480B2

(12) United States Patent
Woodard et al.

(10) Patent No.: US 8,035,480 B2
(45) Date of Patent: Oct. 11, 2011

(54) SHOWING MANAGEMENT SYSTEM TO AUTOMATICALLY MATCH AND CONTROL ELECTRONIC LOCKBOXES

(75) Inventors: Scott E. Woodard, Clarendon Hills, IL (US); Herbert Greenman, Palo Alto, CA (US); Depeng Bi, Buffalo Grove, IL (US)

(73) Assignee: ShowingTime.com, Inc., Chicago, IL (US)

( * ) Notice: Subject to any disclaimer, the term of this patent is extended or adjusted under 35 U.S.C. 154(b) by 869 days.

(21) Appl. No.: 12/039,544

(22) Filed: Feb. 28, 2008

(65) Prior Publication Data

US 2009/0219133 A1 Sep. 3, 2009

(51) Int. Cl.

| | |
|---|---|
| ***B60R 25/00*** | (2006.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |

(52) U.S. Cl. ...................................................... 340/5.73

(58) Field of Classification Search .................. 340/5.73
See application file for complete search history.

(56) References Cited

U.S. PATENT DOCUMENTS

| | | | | |
|---|---|---|---|---|
| 4,766,746 | A * | 8/1988 | Henderson et al. | 340/5.73 |
| 5,046,084 | A * | 9/1991 | Barrett et al. | 379/102.06 |
| 5,705,991 | A * | 1/1998 | Kniffin et al. | 340/5.28 |
| 6,472,973 | B1 * | 10/2002 | Harold et al. | 340/5.73 |
| 7,177,819 | B2 * | 2/2007 | Muncaster et al. | 705/313 |
| 2001/0047282 | A1 * | 11/2001 | Raveis, Jr. | 705/7 |
| 2003/0179075 | A1 * | 9/2003 | Greenman | 340/5.54 |
| 2007/0290799 | A1 * | 12/2007 | Harkins et al. | 340/5.73 |

* cited by examiner

*Primary Examiner* — Daniel Wu
*Assistant Examiner* — Mohamed Barakat
(74) *Attorney, Agent, or Firm* — Eugene M. Cummings, P.C.

(57) ABSTRACT

A showing management system for automatically controlling access to an electronic lockbox utilizing showing appointment data maintained by the showing management system, whereby the showing appointment data is transmitted to the electronic lockbox and/or electronic key device. The electronic lockbox will open only when the actual access time is within the scheduled showing appointment time. The showing management system further programmatically matching a specific electronic lockbox with a specific Listing ID, whereby lockbox access data from an electronic lockbox are matched with showing appointment records maintained in the showing management system to complete the lockbox access records when the Listing ID for a particular showing appointment is missing from the lockbox access record.

7 Claims, 23 Drawing Sheets

FIG. 17

| | 0 | 0.01 | 0.02 | 0.03 | 0.04 | 0.05 | 0.06 | 0.07 | 0.08 | 0.09 |
|---|---|---|---|---|---|---|---|---|---|---|
| 0 | 0.5 | 0.504 | 0.508 | 0.512 | 0.516 | 0.5199 | 0.5239 | 0.5279 | 0.5319 | 0.5359 |
| 0.1 | 0.5398 | 0.5438 | 0.5478 | 0.5517 | 0.5557 | 0.5596 | 0.5636 | 0.5675 | 0.5714 | 0.5753 |
| 0.2 | 0.5793 | 0.5832 | 0.5871 | 0.591 | 0.5948 | 0.5987 | 0.6026 | 0.6064 | 0.6103 | 0.6141 |
| 0.3 | 0.6179 | 0.6217 | 0.6255 | 0.6293 | 0.6331 | 0.6368 | 0.6406 | 0.6443 | 0.648 | 0.6517 |
| 0.4 | 0.6554 | 0.6591 | 0.6628 | 0.6664 | 0.67 | 0.6736 | 0.6772 | 0.6808 | 0.6844 | 0.6879 |
| 0.5 | 0.6915 | 0.695 | 0.6985 | 0.7019 | 0.7054 | 0.7088 | 0.7123 | 0.7157 | 0.719 | 0.7224 |
| 0.6 | 0.7257 | 0.7291 | 0.7324 | 0.7357 | 0.7389 | 0.7422 | 0.7454 | 0.7486 | 0.7517 | 0.7549 |
| 0.7 | 0.758 | 0.7611 | 0.7642 | 0.7673 | 0.7704 | 0.7734 | 0.7764 | 0.7794 | 0.7823 | 0.7852 |
| 0.8 | 0.7881 | 0.791 | 0.7939 | 0.7967 | 0.7995 | 0.8023 | 0.8051 | 0.8078 | 0.8106 | 0.8133 |
| 0.9 | 0.8159 | 0.8186 | 0.8212 | 0.8238 | 0.8264 | 0.8289 | 0.8315 | 0.834 | 0.8365 | 0.8389 |
| 1 | 0.8413 | 0.8438 | 0.8461 | 0.8485 | 0.8508 | 0.8531 | 0.8554 | 0.8577 | 0.8599 | 0.8621 |
| 1.1 | 0.8643 | 0.8665 | 0.8686 | 0.8708 | 0.8729 | 0.8749 | 0.877 | 0.879 | 0.881 | 0.883 |
| 1.2 | 0.8849 | 0.8869 | 0.8888 | 0.8907 | 0.8925 | 0.8944 | 0.8962 | 0.898 | 0.8997 | 0.9015 |
| 1.3 | 0.9032 | 0.9049 | 0.9066 | 0.9082 | 0.9099 | 0.9115 | 0.9131 | 0.9147 | 0.9162 | 0.9177 |
| 1.4 | 0.9192 | 0.9207 | 0.9222 | 0.9236 | 0.9251 | 0.9265 | 0.9279 | 0.9292 | 0.9306 | 0.9319 |
| 1.5 | 0.9332 | 0.9345 | 0.9357 | 0.937 | 0.9382 | 0.9394 | 0.9406 | 0.9418 | 0.9429 | 0.9441 |
| 1.6 | 0.9452 | 0.9463 | 0.9474 | 0.9484 | 0.9495 | 0.9505 | 0.9515 | 0.9525 | 0.9535 | 0.9545 |
| 1.7 | 0.9554 | 0.9564 | 0.9573 | 0.9582 | 0.9591 | 0.9599 | 0.9608 | 0.9616 | 0.9625 | 0.9633 |
| 1.8 | 0.9641 | 0.9649 | 0.9656 | 0.9664 | 0.9671 | 0.9678 | 0.9686 | 0.9693 | 0.9699 | 0.9706 |
| 1.9 | 0.9713 | 0.9719 | 0.9726 | 0.9732 | 0.9738 | 0.9744 | 0.975 | 0.9756 | 0.9761 | 0.9767 |
| 2 | 0.9772 | 0.9778 | 0.9783 | 0.9788 | 0.9793 | 0.9798 | 0.9803 | 0.9808 | 0.9812 | 0.9817 |
| 2.1 | 0.9821 | 0.9826 | 0.983 | 0.9834 | 0.9838 | 0.9842 | 0.9846 | 0.985 | 0.9854 | 0.9857 |
| 2.2 | 0.9861 | 0.9864 | 0.9868 | 0.9871 | 0.9875 | 0.9878 | 0.9881 | 0.9884 | 0.9887 | 0.989 |
| 2.3 | 0.9893 | 0.9896 | 0.9898 | 0.9901 | 0.9904 | 0.9906 | 0.9909 | 0.9911 | 0.9913 | 0.9916 |
| 2.4 | 0.9918 | 0.992 | 0.9922 | 0.9925 | 0.9927 | 0.9929 | 0.9931 | 0.9932 | 0.9934 | 0.9936 |
| 2.5 | 0.9938 | 0.994 | 0.9941 | 0.9943 | 0.9945 | 0.9946 | 0.9948 | 0.9949 | 0.9951 | 0.9952 |
| 2.6 | 0.9953 | 0.9955 | 0.9956 | 0.9957 | 0.9959 | 0.996 | 0.9961 | 0.9962 | 0.9963 | 0.9964 |
| 2.7 | 0.9965 | 0.9966 | 0.9967 | 0.9968 | 0.9969 | 0.997 | 0.9971 | 0.9972 | 0.9973 | 0.9974 |
| 2.8 | 0.9974 | 0.9975 | 0.9976 | 0.9977 | 0.9977 | 0.9978 | 0.9979 | 0.9979 | 0.998 | 0.9981 |
| 2.9 | 0.9981 | 0.9982 | 0.9982 | 0.9983 | 0.9984 | 0.9984 | 0.9985 | 0.9985 | 0.9986 | 0.9986 |
| 3 | 0.9987 | 0.9987 | 0.9987 | 0.9988 | 0.9988 | 0.9989 | 0.9989 | 0.9989 | 0.999 | 0.999 |
| 3.1 | 0.999 | 0.9991 | 0.9991 | 0.9991 | 0.9992 | 0.9992 | 0.9992 | 0.9992 | 0.9993 | 0.9993 |
| 3.2 | 0.9993 | 0.9993 | 0.9994 | 0.9994 | 0.9994 | 0.9994 | 0.9994 | 0.9995 | 0.9995 | 0.9995 |
| 3.3 | 0.9995 | 0.9995 | 0.9995 | 0.9996 | 0.9996 | 0.9996 | 0.9996 | 0.9996 | 0.9996 | 0.9997 |
| 3.4 | 0.9997 | 0.9997 | 0.9997 | 0.9997 | 0.9997 | 0.9997 | 0.9997 | 0.9997 | 0.9997 | 0.9998 |

SHOWING MANAGEMENT SYSTEM TO AUTOMATICALLY MATCH AND CONTROL ELECTRONIC LOCKBOXES

FIELD OF THE INVENTION

The present invention relates generally to systems controlling access to property such as real estate and is particularly directed to a showing management system for controlling access to electronic real estate lockboxes. The invention is disclosed as a system and method for automatically controlling access to an electronic real estate lock box utilizing showing appointment data maintained by a central showing management system. The invention is further disclosed as a system and method to programmatically match an electronic lockbox with a property/real estate listing utilizing lockbox access records and showing appointment records.

DESCRIPTION OF THE PRIOR ART

Paramount in the real estate business is the need to show properties for sale to potential buyers. This requires the buyer and the buyer's agent (showing agent) to access the seller's property, usually when the seller is absent. Traditionally, real estate agents have used lockboxes to store the keys to the seller's property for retrieval by showing agents. These lockboxes have long been purely mechanical, requiring an access combination, a special key, or both, to be unlocked. However, to address and improve privacy, safety and efficiency, the real estate industry has begun to use electronic real estate lock box systems to manage the access to seller's properties. The main components of these lockbox systems are an electronic lockbox, an electronic key device to open the electronic lockbox and a supervisory central computer system/database.

The functionality of a prior art electronic lockbox system (see FIG. 1) can be briefly summarized as follows. The buyer's agent (showing agent) carries an electronic key device 104, which can be a PDA, a cell phone, or a custom device adapted to wirelessly communicate with the electronic lockbox 103 and the central computer system/database 200. In order to physically remove the property key locked inside the electronic lockbox 103, the lockbox 103 requires the input of a unique access code in order to be unlocked. The access code may be generated by the central computer system 200 and is transmitted to the electronic key device 104. The electronic key device 104 will then transmit the received unique access code, to the electronic lockbox 103. Alternatively, the electronic key device 104 will present the access code to the showing agent, who must then manually input the access code into the electronic lockbox 103. The electronic lockbox 103 will then compare the received access code to an internally generated access code; and if the codes match, access will be allowed.

The data describing the lockbox access is stored in the electronic key device 104, the electronic lockbox 103, or both. The electronic key device 104 is further capable of transmitting certain access data to the central computer system/database 200 for further processing. Access data may include identifications of the electronic key device and the key device holder, e.g., the Showing Agent ID, access date and time, property identification (Listing ID), etc. The ability to track, store and centrally process these access data are a valuable tool for the real estate industry. Knowing when and who has actually accessed a listed property not only addresses safety concerns, but also provides sellers and agents with valuable information about the interest in the property listing.

For example, the stored access data makes it easier to contact the showing agent after a showing to collect feedback on how the property was perceived by the potential buyer.

However, in order to accurately process the access data collected from electronic lockboxes and/or electronic keys, a central processing system needs reliable data pertaining to which specific electronic lockbox is assigned to which specific property listing. Electronic lockboxes are inherently mobile, i.e., they are moved from one property listing to the next, when a specific property no longer is available for showing appointments. There is no preset or pre-configured association between a lockbox and a particular property listing. The prior art attempts to establish at least a temporary association between the lockbox and the property listing by requiring the seller's agent (listing agent) or listing office personnel to enter both the Lockbox ID (usually a serial number, or some other form of unique Lockbox ID) and the unique property listing code. Of course, the reliance on manual data input introduces the possibility of human error or simply neglect. Manually entering all of the required data also takes time. Yet, a database with missing data cannot be efficiently and correctly mined for data.

U.S. Pat. Nos. 6,989,732 and 7,009,489, hereby incorporated by reference, teach electronic lockbox systems including date and time access control mechanisms to prevent showing agents, even with valid key devices, from gaining access to a lockbox, i.e., a property, at any time. Those systems enable users to individually allow or deny access to an electronic lockbox at specified times. These predetermined access time windows are stored inside the electronic lockbox and in the central computer system/database. When the showing agent enters a unique access code into the electronic lockbox, the lockbox compares the current time with the predetermined access time data for the particular lockbox. If the showing agent attempts to access the lockbox at a time that is outside of the predetermined access time window, access is denied.

United States Publication Number 2003/0179075, hereby incorporated by reference, teaches an alternative system of time-based access control. Instead of conditioning the authorized access to the electronic lockbox on a positive match of the current access time and a predetermined access time window, these systems generate an access code that is unique for the predetermined date and time of access and/or the person seeking access. That unique access code is only valid for the authorized user during the predetermined access time, which may include a grace period for attempting to access the lockbox a little early or a little later than the beginning of the predetermined showing time. The time based access code is provided to the authorized showing agent by the central computer system. In order to unlock the electronic lockbox, the showing agent must manually enter a unique agent ID as well as the time-based access code into the electronic lockbox.

In addition to the central computer system/database 200 managing the electronic lockboxes 103 and electronic key devices 104, so called showing management systems 100 are also used in the real estate industry. A showing management system 100 allows showing agents to make showing appointments for selected property listings. These showing managements systems 100, such as ShowingTime™'s ShowingDesk™ software, see U.S. Pat. No. 6,973,432, hereby incorporated by reference, typically integrate with or connect to one or more listing services to update its database of property listings. Showing agents can make showing appointments by directly accessing the showing management system 100 through an access device, such as a personal computer, as depicted in FIG. 2. The access device is connected to the showing management system 100 through either a wired or a wireless communications network. The showing management system 100 provides the showing agent with real-time access to all available property listings of the associated listing service. The showing agent can see the status of each property listing and available showing times making it very convenient to schedule a showing appointment. The scheduled appointment is stored real-time in the showing management system's database and is immediately visible to other showing agents accessing the showing management system. The information that is stored in the showing management system's database may include, but is not limited to, Listing ID, Showing Agent ID, and showing appointment start/end date and time.

However, the prior art systems above do not provide for a seamless integration of property listing and showing appointment data maintained by a central showing management system with electronic lockbox systems, including the seamless data exchange between a showing management system and associated electronic lockboxes or lockbox management systems. It would therefore be desirable if access to electronic lockboxes could be controlled by a central showing management system. Furthermore, there is currently no reliable way to automatically and accurately match an electronic lockbox with a specific property listing or to automatically and accurately include missing data in a showing management system utilizing electronic lockbox access data and showing appointment records.

OBJECTS OF THE INVENTION

Accordingly, it is an object of this invention to provide a system and method for automatically controlling access to an electronic lockbox utilizing showing appointment data maintained by a central showing management system.

It is yet another object of this invention to provide a system and method to programmatically match a specific electronic lockbox with the specific property/real estate listing utilizing access data from electronic lockboxes and showing appointment records stored in a central showing management system.

SUMMARY OF THE INVENTION

Accordingly it is an advantage of the present invention to provide automatic access control to an electronic real estate lockbox utilizing showing appointment data maintained by a showing management system, whereby the showing appointment data is transmitted directly to the electronic lockbox and/or an electronic key device, potentially also utilizing a third party lockbox server system. The showing appointment data may include, but is not limited to, a listing identifier, a showing agent identifier, and a showing appointment time. The showing appointment time defines a time range in which access to the electronic lockbox is permitted. The time range may begin exactly at the scheduled start time of the showing appointment and end exactly at the scheduled end time of the showing appointment. Alternatively, the time range may begin a defined period of time before the scheduled start time of the showing appointment and end a defined period of time after the scheduled end time of the showing appointment. The electronic lockbox will open only when the actual access time is within the scheduled showing appointment time. Alternatively, access to the electronic lockbox may further require that the accessing Showing Agent ID matches the Showing Agent ID of the agent who scheduled or requested the showing appointment in the showing management system for this particular Listing ID.

It is a further advantage of the present invention to provide programmatic matching of a specific electronic lockbox with a specific Listing ID, whereby access data from an electronic lockbox is matched with showing appointment records maintained in a showing management system to complete the lockbox access records when the Listing ID for a particular showing appointment is missing from the lockbox access record. The disclosed programmatic matching can also complete the lockbox access record when the Showing Agent ID is missing, matching lockbox access data with showing appointment records.

To achieve the foregoing and other advantages, and in accordance with one aspect of the present invention, a method for restricting access to a real property is provided, wherein said real property includes an access control mechanism restricting access to at least a portion of said real property and in which the method comprises the steps of: scheduling for said real property a showing appointment, including a showing time period, for at least one showing agent of a plurality of showing agents to access said real property during said showing time period, said at least one showing agent being associated with a unique showing agent identifier; storing said showing appointment in a database, said database operatively associated with a showing management system; communicating said showing appointment including said showing time period and said unique showing agent identifier of said at least one showing agent to said access control mechanism; and restricting access to said real property except for allowing said showing agent associated with said showing agent identifier to access said real property during said showing time period.

In accordance with another aspect of the present invention, a method for assigning a lockbox to a real property is provided, in which the method comprises the steps of: attaching said lockbox physically to said real property; scheduling a showing appointment for said real property using a showing management system, said showing management system generating a record based on said showing appointment, said record comprising a showing time period, at least one unique showing agent identifier for at least one showing agent of a plurality of showing agents and an identifier for said real property; storing said record in a showing appointment database operatively associated with said showing management system and containing a plurality of scheduled showing appointment; accessing said lockbox and recording each access event in an access record, each of said access events comprising an access time, a unique showing agent identifier corresponding to the accessing showing agent and a lockbox identifier corresponding to said lockbox; communicating said access event record to said showing management system; retrieving from said showing appointment database all the scheduled showing appointments for said recorded showing agent identifier and computing a matching one of said showing appointments in which said recorded access time falls within said scheduled showing time period; and assigning the real property identifier associated with said matching showing appointment to said lockbox, whereby said matching showing appointment is updated by adding said lockbox identifier to said lockbox access record.

In accordance with still a further aspect of the present invention, a method for associating a plurality of lockboxes with a plurality of real properties is provided, the method comprising the steps of: attaching each of said lockboxes physically to a particular real property; logging a plurality of access events associated with each of said lockboxes in an access record, said access events each comprising an access time, a unique showing agent identifier corresponding to the accessing showing agent, and a lockbox identifier corresponding to said lockbox; communicating said plurality of access events to a showing management system; for each access event within said plurality of access events, associating said access event with a showing appointment record, said showing appointment record including at least a real property identifier corresponding to a particular real property, an access time, and a unique showing agent identifier corresponding to the accessing showing agent, wherein said step of associating includes matching the access time in said access event with the access time in said showing appointment record and matching the unique showing agent identifier in said access event with the unique showing agent identifier in said showing appointment record, wherein said step of associating further includes stochastically calculating a probability that a particular lockbox identifier is associated with a particular real property identifier based on said step of matching; and associating a particular lockbox identifier with a particular real property identifier when said probability exceeds a predetermined value.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative and not as restrictive.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 17 depicts a table of cumulative probabilities for a standard normal distribution.

DETAILED DESCRIPTION OF THE ILLUSTRATED EMBODIMENT

Figure 1:
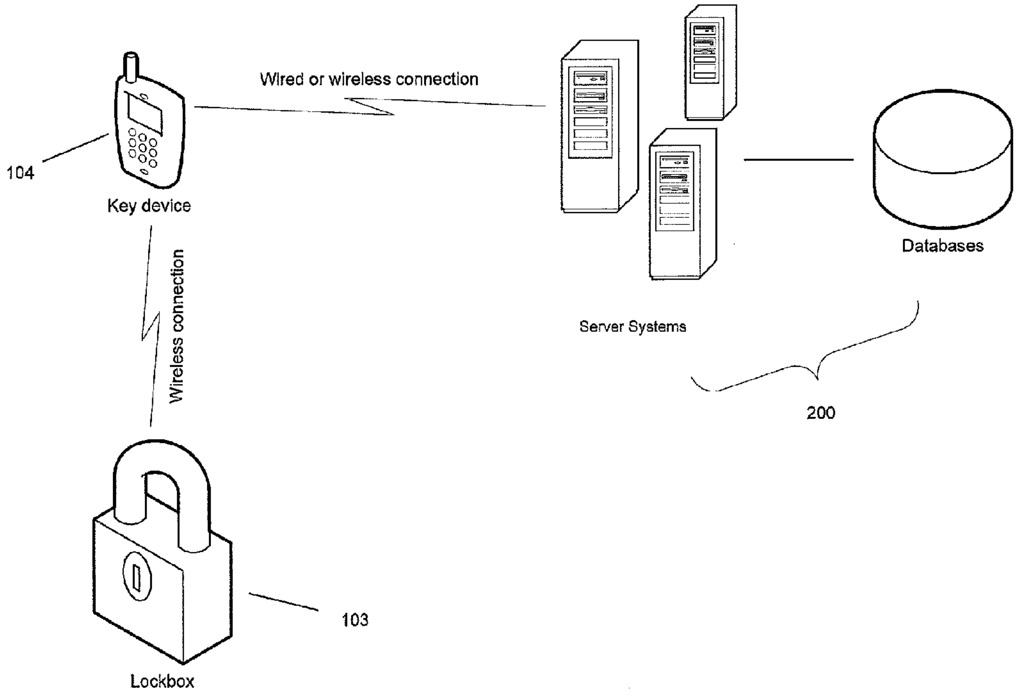
FIG. 1 (Prior Art)
FIG. 1 depicts a prior art electronic lockbox system.
Figure 2:
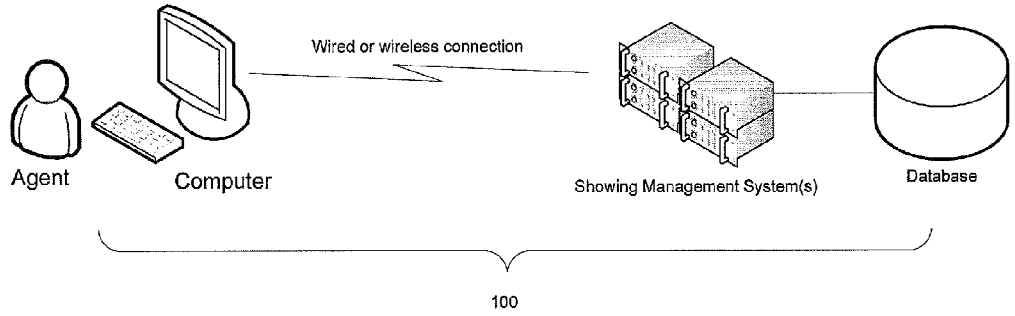
FIG. 2 (Prior Art)
FIG. 2 depicts a prior art showing management system.

The disclosed invention provides for improved functionality and management of electronic lockboxes 103 and electronic key devices 104 by integrating an electronic lockbox system (see FIG. 1) with a showing management system (see FIG. 2).

Automatic Access Control

One aspect of this invention is automatic access control to an electronic lockbox 103 utilizing scheduled showing appointment data maintained by the showing management system 100, whereby the scheduled showing appointment data is transmitted to the associated electronic lockbox 103 and/or electronic key device 104. The electronic lockbox 103 will open only when the actual access time is within the scheduled showing appointment time, whereby the showing appointment time is the time range within which lockbox access is granted to a particular Showing Agent ID. The following example illustrates this access control:

Showing agent Smith with the Showing Agent ID 534 uses the showing management system 100 to schedule a showing appointment for the property with the Listing ID 1234 on Jan. 11, 2008 between 10:00 AM and 11:00 AM. The actual showing appointment time may begin some time before 10:00 AM (X) and end some time after 11:00 AM (Y) on Jan. 11, 2008. The value for X and Y can be fixed values across the systems or could vary, for example, depending on individual showing appointments, different showing management systems, markets, properties, lockboxes, etc. The showing management system 100 also stores the Showing Agent ID of the showing agent authorized to access the electronic lockbox 103. The showing appointment time, the Showing Agent ID, and other data jointly constitutes showing appointment data. The showing management system 100 then transmits the showing appointment data to the electronic lockbox 103 that is assigned to the Listing ID for which the appointment was made. Assuming, that in the above example the value for X has been set to 30 minutes and the value for Y has been set to 15 minutes, the agent corresponding to Showing Agent ID 534 will not be able to access the lockbox 103 associated with the Listing ID 1234 before 9:30 AM and after 11:15 AM on Jan. 11, 2008. Furthermore, in this example, only the showing agent with the Showing Agent ID 534 will be allowed access to the lockbox 103 between 9:30 AM and 11:15 AM on Jan. 11, 2008.

In another embodiment of this invention the showing management system could allow for an assignment of a plurality of showing agents, i.e., Showing Agent IDs, to a particular scheduled showing appointment, thus allowing for parallel and/or overlapping appointments and access by more than one showing agent. In this case, all the assigned agents form a team. A team may consist of two or more members and the team members can represent each other in the sense of scheduling appointments and showing properties. The information that a plurality of agents with different respective Showing Agent IDs are a team may be provided by the respective agents, offices, brokerage, MLS or other entities. The showing management system is further able to define and manage teams of showing agents.

Transmission of Showing Appointment Data

Figure 3A:
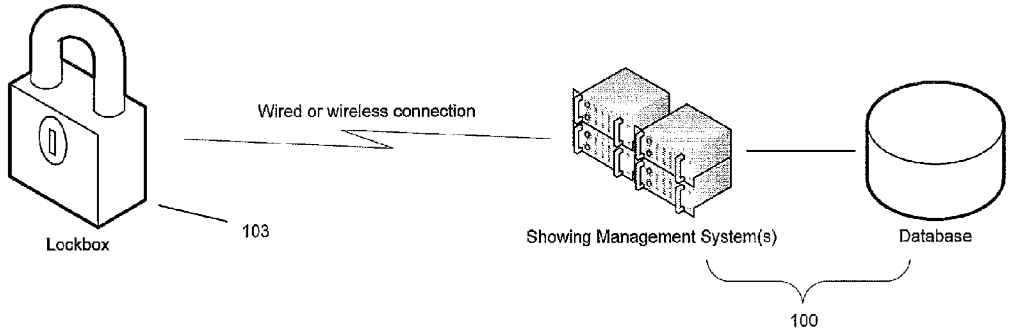
FIG. 3A depicts one embodiment of transmitting showing appointment data directly to the electronic lockbox.

With regard to the transmission of the showing appointment data to the electronic lockbox, there are many different possible embodiments. In one embodiment, shown in FIG. 3A, the showing management system 100 transmits the showing appointment data directly to the electronic lockbox 103 that has been assigned to the property for which the showing has been scheduled. In this embodiment, the specification of the electronic lockbox 103 needs to include at least a power source, such as a battery, an internal controller, an accurate timer which may be capable of synchronization with a time server, and a storage medium for storing showing appointment data and the lockbox's own unique ID. In this embodiment, the electronic lockbox 103 is further capable to connect to remote servers, such as those associated with a showing management system 100, over a wireless communications network. The electronic lockbox 103 may also be capable to send and receive encrypted data, including encrypted showing appointment data. The wireless connection between the lockbox 103 and the showing management system 100 may be permanent or only temporary following an activation request. A wired connection may also be implemented but appears to be of limited practicality for portable electronic lockboxes.

Figure 3B:
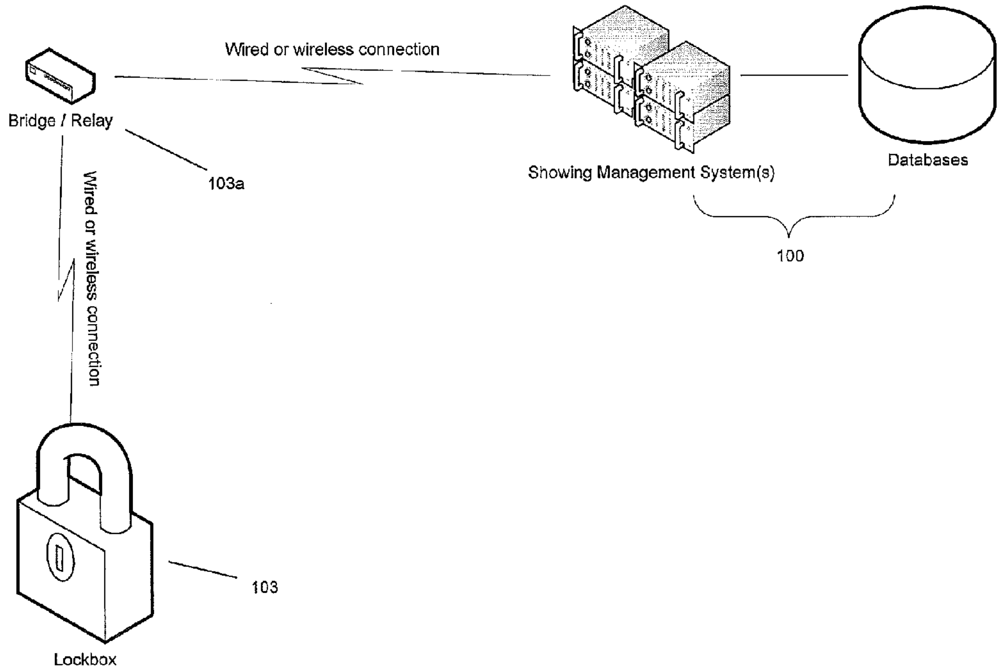
FIG. 3B depicts one embodiment of transmitting showing appointment data directly to the electronic lockbox, whereby the electronic lockbox is powered by a bridge/relay device (e.g., computer, wireless LAN access point, etc.)

FIG. 3B shows another embodiment where the showing management system 100 transmits the showing appointment data directly to the electronic lockbox 103 that has been assigned to the property for which the showing has been scheduled. However, in this embodiment, the electronic lockbox 103 is operatively coupled to and powered by a powered bridge/relay device 103A, capable of receiving and transmitting data. The bridge/relay device 103A could be, for example, a computer, a wireless LAN access point, etc. The bridge/relay device 103A is operatively coupled to the electronic lockbox 103 via a wired or wireless communications link.

Figure 3C:
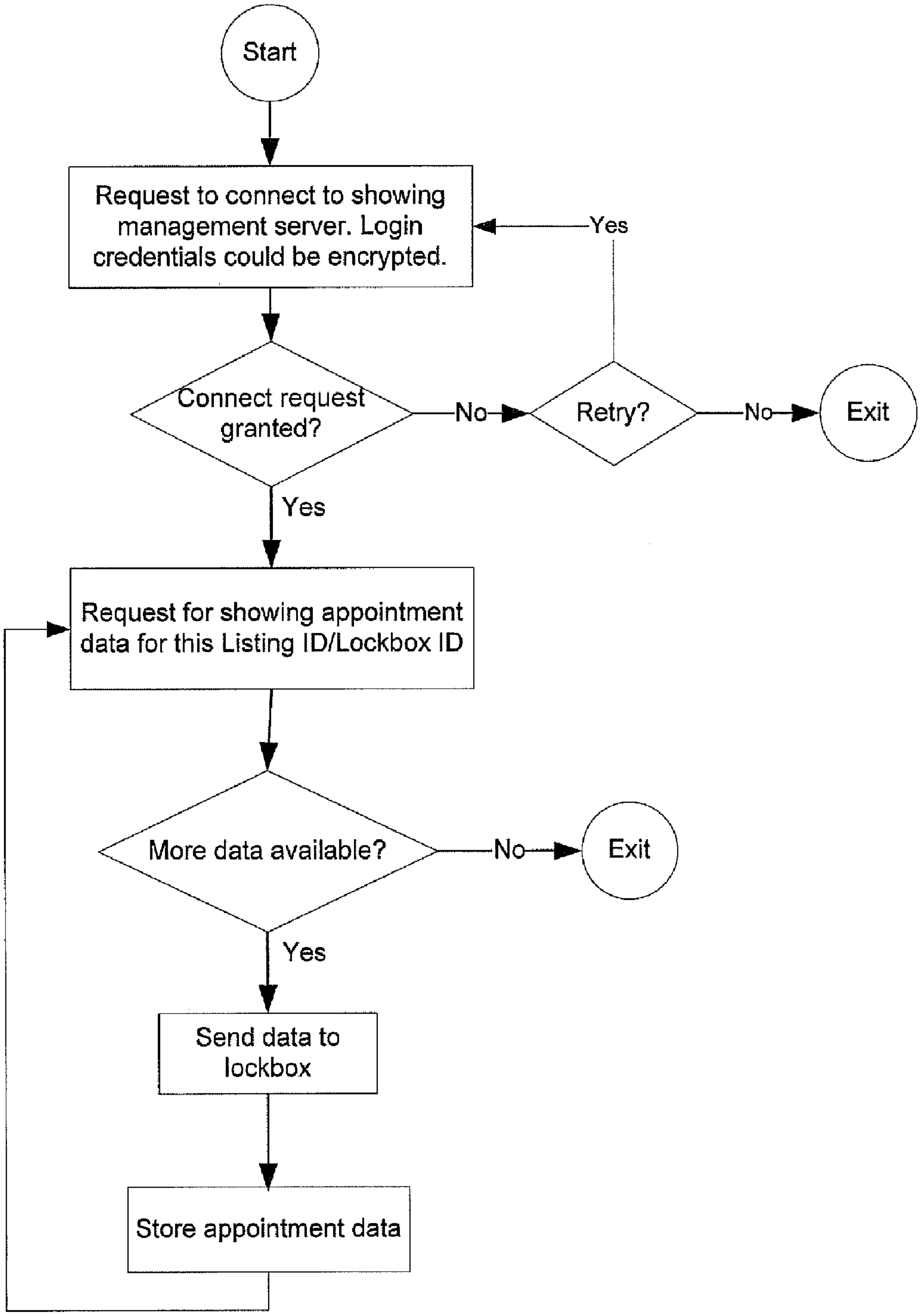
FIG. 3C depicts one embodiment of logic for transmitting showing appointment data from the showing management system to the electronic lockbox.

FIG. 3C shows a possible sequence of steps for transmitting showing appointment data from the showing management system 100 directly to the electronic lockbox 103. Upon request, the electronic lockbox 103 establishes a connection to a server of the showing management system 100. The electronic lockbox 103 then requests from the showing management system 100 all showing appointment data for the property associated with the requesting electronic lockbox 103. The showing appointment data for the property associated with the electronic lockbox 103 is then transmitted from the showing management system 100 to the electronic lockbox 103 via the communications link. The transmitted showing appointment data is then stored in a storage medium inside the electronic lockbox 103.

Figure 4A:
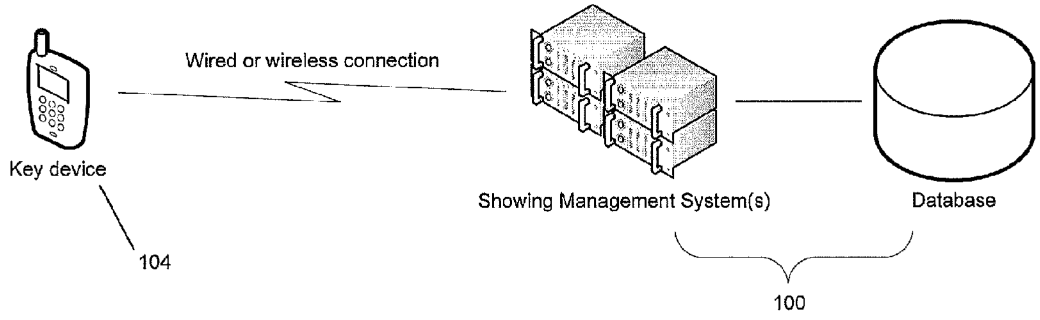
FIG. 4A depicts one embodiment of transmitting showing appointment data directly to the electronic key device.

In another embodiment, shown in FIG. 4A, the showing management system 100 transmits the showing appointment data directly to an electronic key device 104 that has been assigned to the showing agent who is scheduled to show the property to which the transmitted showing appointment data pertains to. In this embodiment, the specification of the electronic key device 104 needs to include at least, but is not limited to, a power source, an internal controller, an accurate timer which may be capable of synchronization with a timer server, and a storage medium for storing at least showing appointment data, the key device's own unique ID or the Showing Agent ID who uses the key device 104. In this embodiment, the electronic key device 104 is further capable to connect to remote servers, such as those associated with a showing management system 100, over a wireless communications network. The electronic key device 104 may also be capable to send and receive encrypted data, including encrypted showing appointment data. The wireless connection between the key device 104 and the showing management system 100 may be permanent or only temporary following an activation request. A wired connection may also be implemented but appears to be of limited practicality for portable electronic key devices.

Figure 4B:
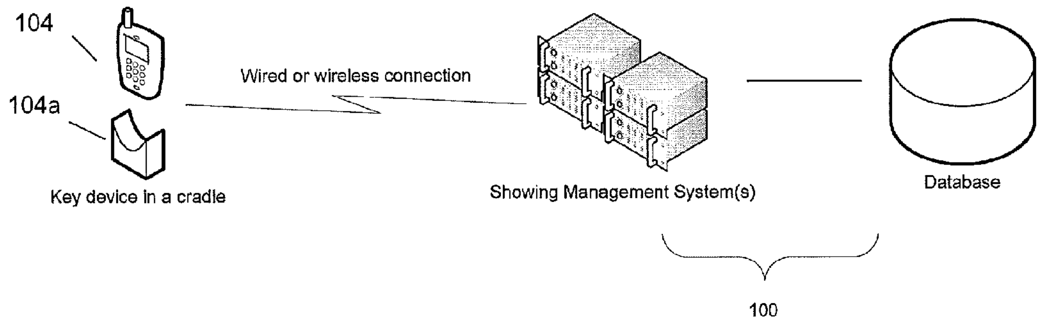
FIG. 4B depicts one embodiment of transmitting showing appointment data directly to the electronic key device coupled to a cradle device, whereby the cradle device may be a bridge/relay device.

FIG. 4B shows another embodiment where the showing management system 100 transmits the showing appointment data directly to the electronic key device 104 that has been assigned to the showing agent who is scheduled to show the property to which the transmitted showing appointment data pertains to. However, in this embodiment, the electronic key device 104 is operatively coupled to a powered bridge/relay device 104A, which may also be capable of receiving and transmitting data. The bridge/relay device 104A is operatively coupled to the electronic key device 104 via a wired or wireless communications link.

Figure 4C:
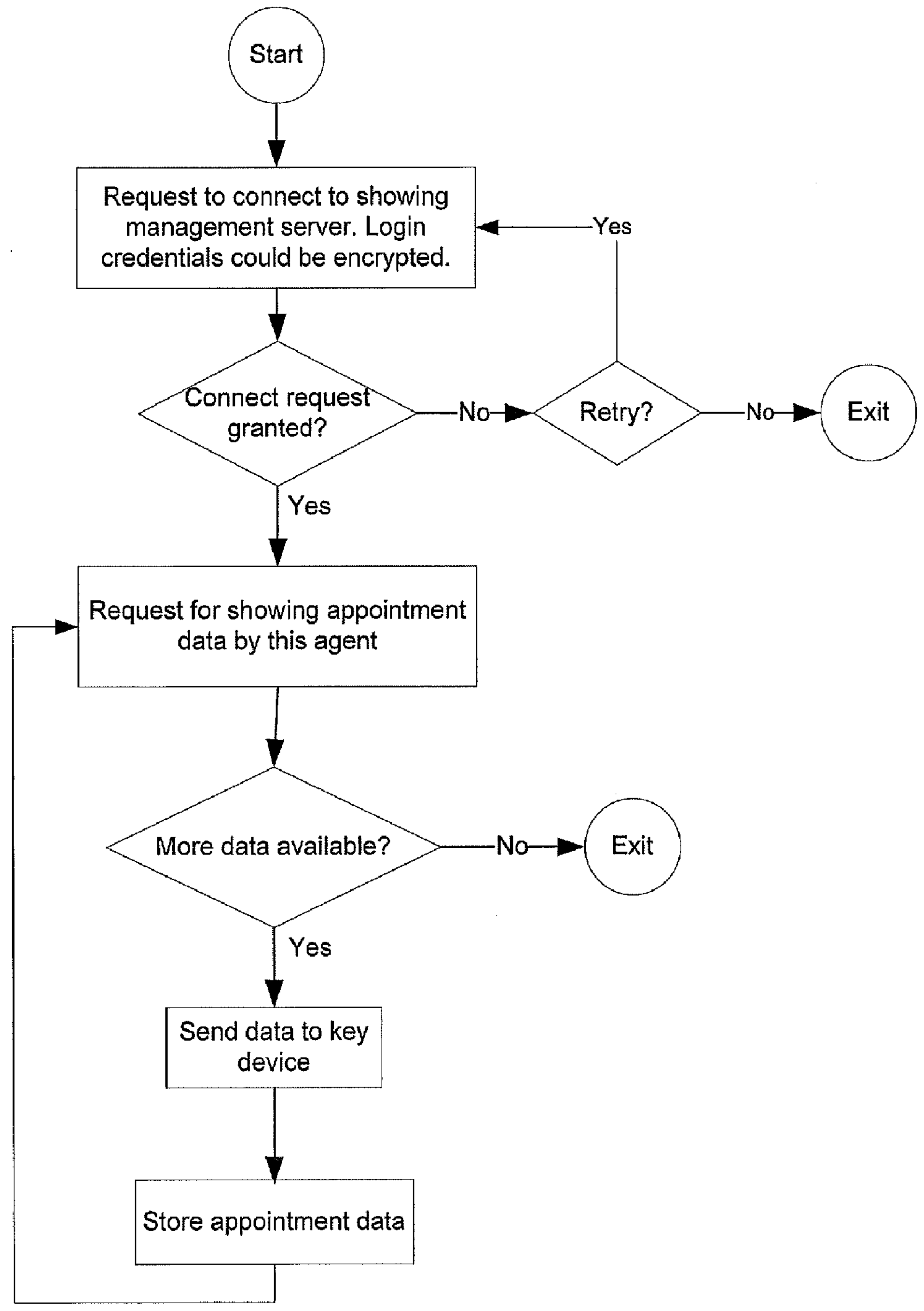
FIG. 4C depicts one embodiment of logic for transmitting showing appointment data from the showing management system to the electronic key device.

FIG. 4C shows a possible sequence of steps for transmitting showing appointment data from the showing management system 100 directly to the electronic key device 104. Upon request, the electronic key device 104 establishes a connection to a server of the showing management system 100. The electronic key device 104 then requests from the showing management system 100 all showing appointment data for the property associated with the requesting showing agent using the electronic key device 104. The showing appointment data for the requesting showing agent is then transmitted from the showing management system 100 to the electronic key device 104 via a communications link. The transmitted showing appointment data is then stored in a storage medium inside the electronic key device 104.

Figure 5:
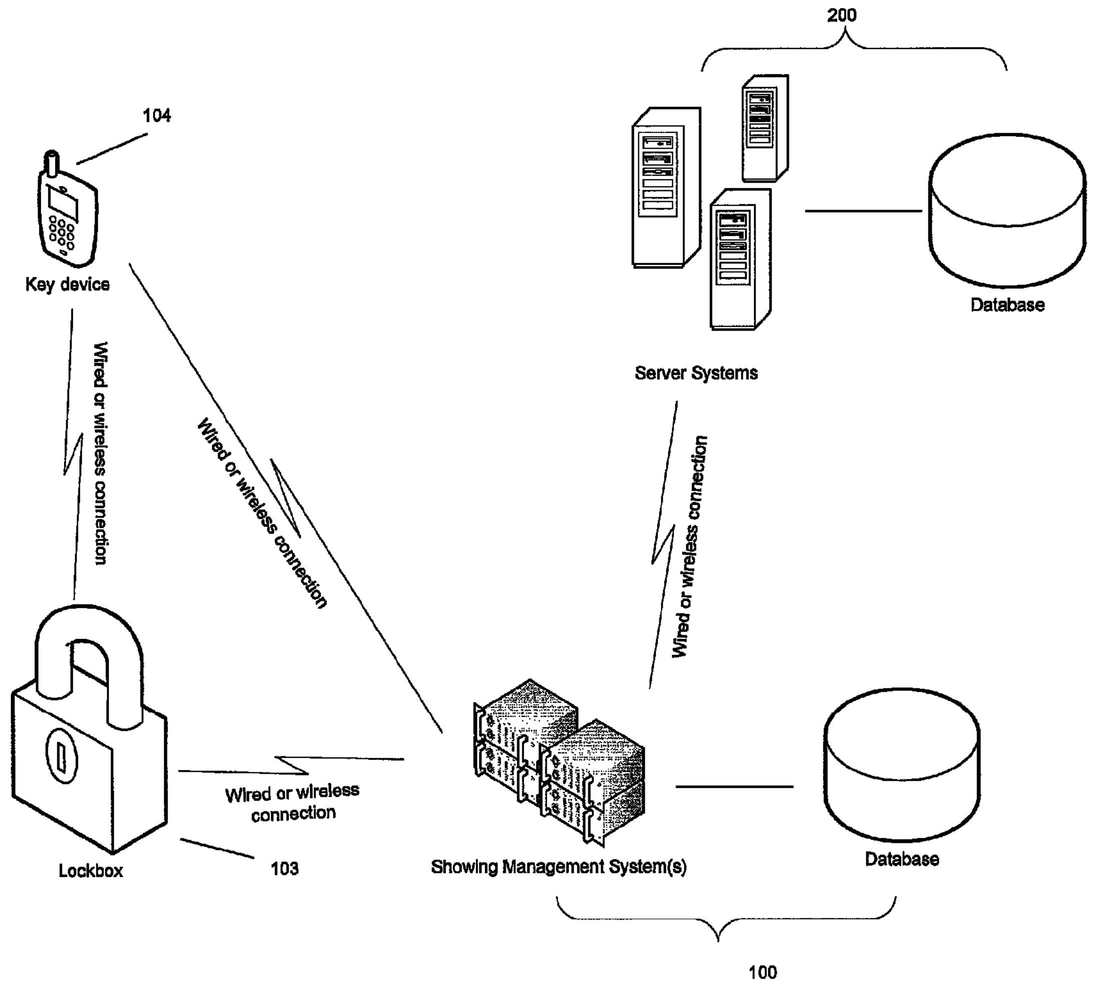
FIG. 5 depicts one embodiment of transmitting showing appointment data from the showing management system indirectly to the electronic lockbox and/or electronic key device, via a third party server system (e.g., electronic lockbox and electronic key device vendor)

FIG. 5 depicts an alternate embodiment, where instead of transmitting showing appointment data from the showing management system 100 directly to the electronic lockbox 103 and/or the electronic key device 104, the showing appointment data could be transmitted via a third party system 200, e.g., the electronic lockbox management system of the electronic lockbox and/or electronic key device vendor).

Figure 6A:
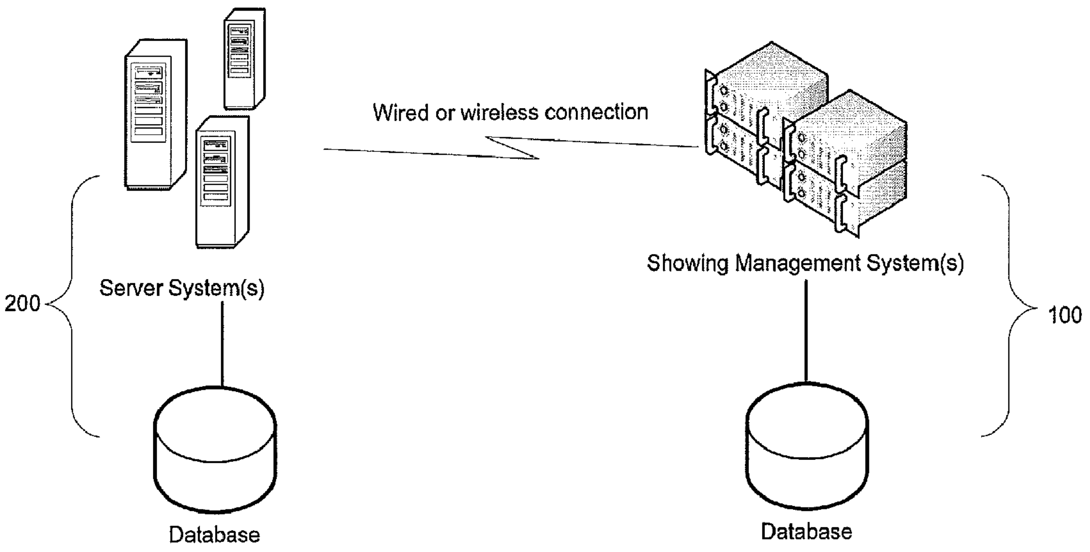
FIG. 6A depicts one embodiment of transmitting showing appointment data from the showing management system to a third party server system.

FIG. 6A depicts one embodiment of transmitting showing appointment data from the showing management system 100 to a third party system 200 via a wired or wireless communications link. The transmission of showing appointment data in FIG. 6A may be accomplished through either a pull or a push mechanism.

Figure 6B:
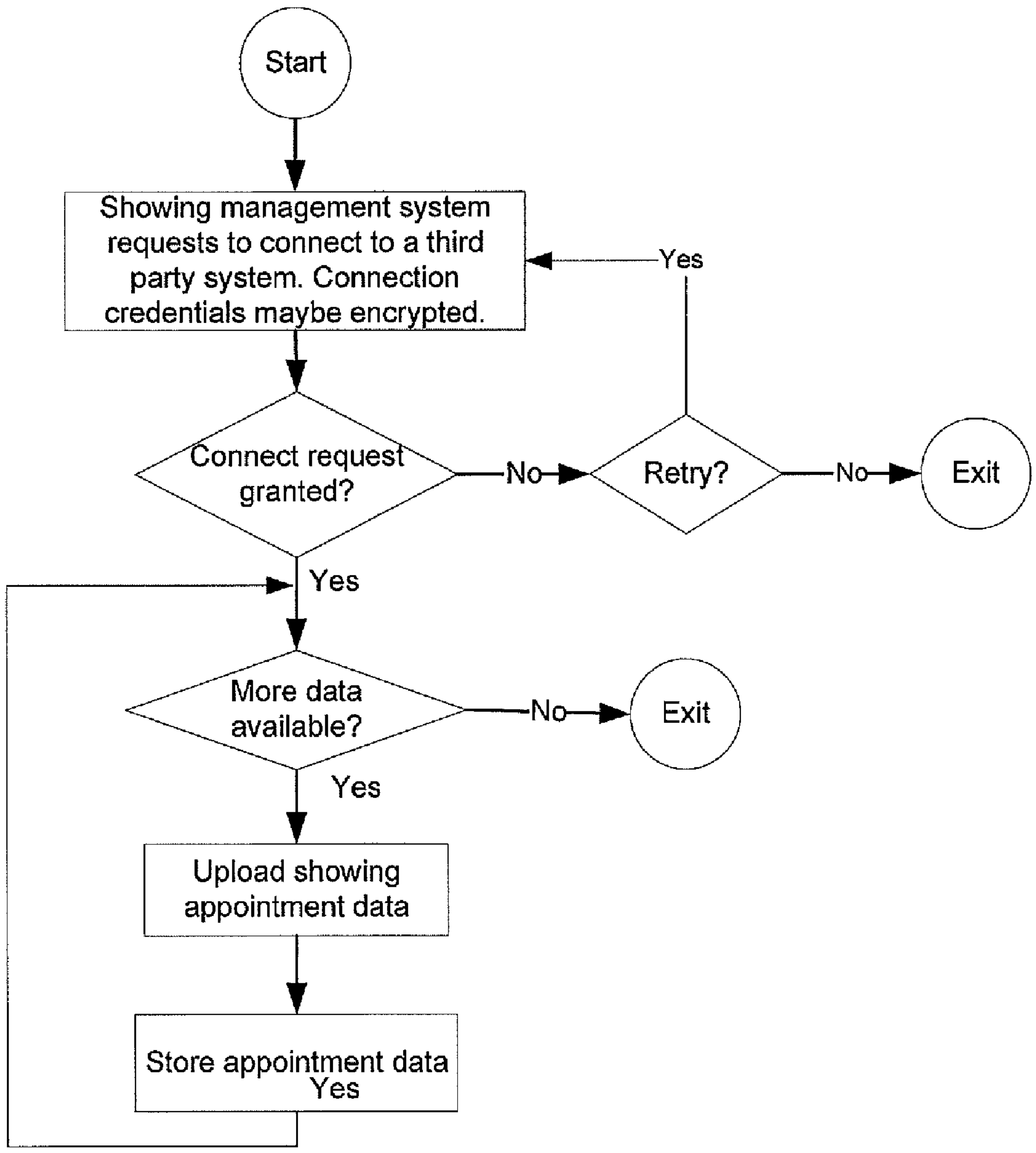
FIG. 6B depicts one embodiment of transmitting showing appointment data from the showing management system to a third party server system via a push mechanism.

FIG. 6B shows one embodiment of transmitting showing appointment data via a push mechanism, whereby the showing management system 100 requests to connect to the third party system 200 and after the connection is established, uploads, i.e., transmits, the showing appointment data from the showing management system 100 to the third party system 200. The transmitted showing appointment data is then stored on the third party system 200.

Figure 6C:
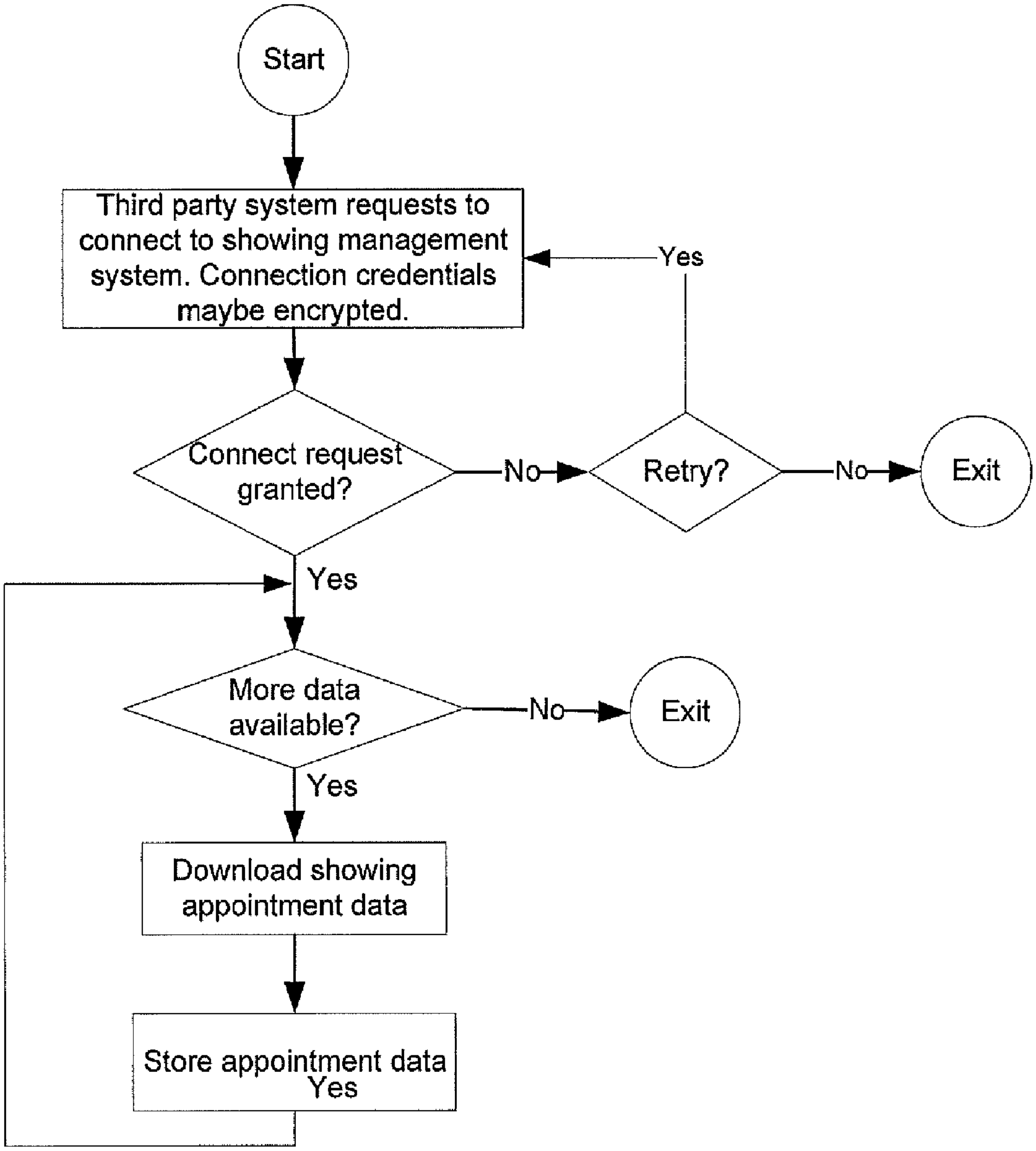
FIG. 6C depicts one embodiment of transmitting showing appointment data from the showing management system to a third party server system via a pull mechanism.

FIG. 6C shows one embodiment of transmitting showing appointment data via a pull mechanism, whereby the third party system 200 requests to connect to the showing management system 100 and after the connection is established, downloads, i.e., receives, the showing appointment data from the showing management system 100 to the third party system 200. The transmitted showing appointment data is then stored on the third party system 200.

Figure 7A:
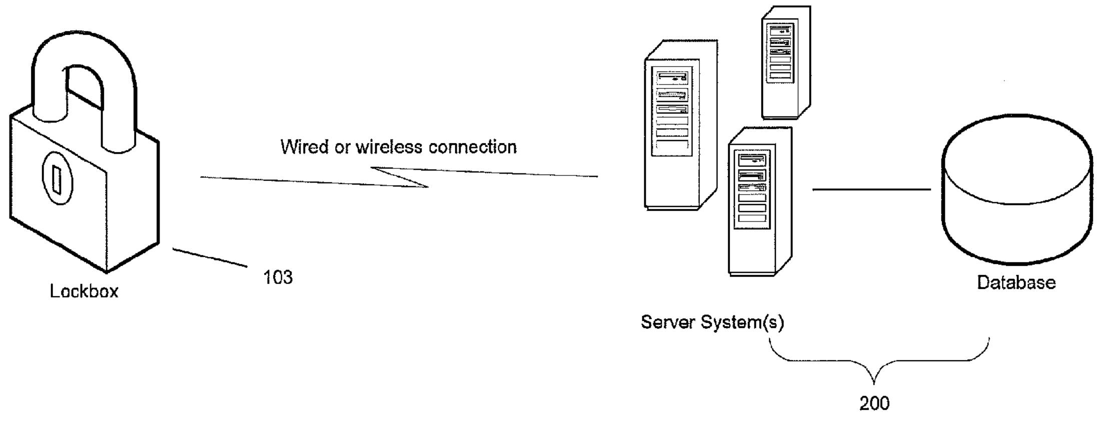
FIG. 7A depicts one embodiment of transmitting showing appointment data from the third party server system directly to the electronic lockbox.
Figure 7B:
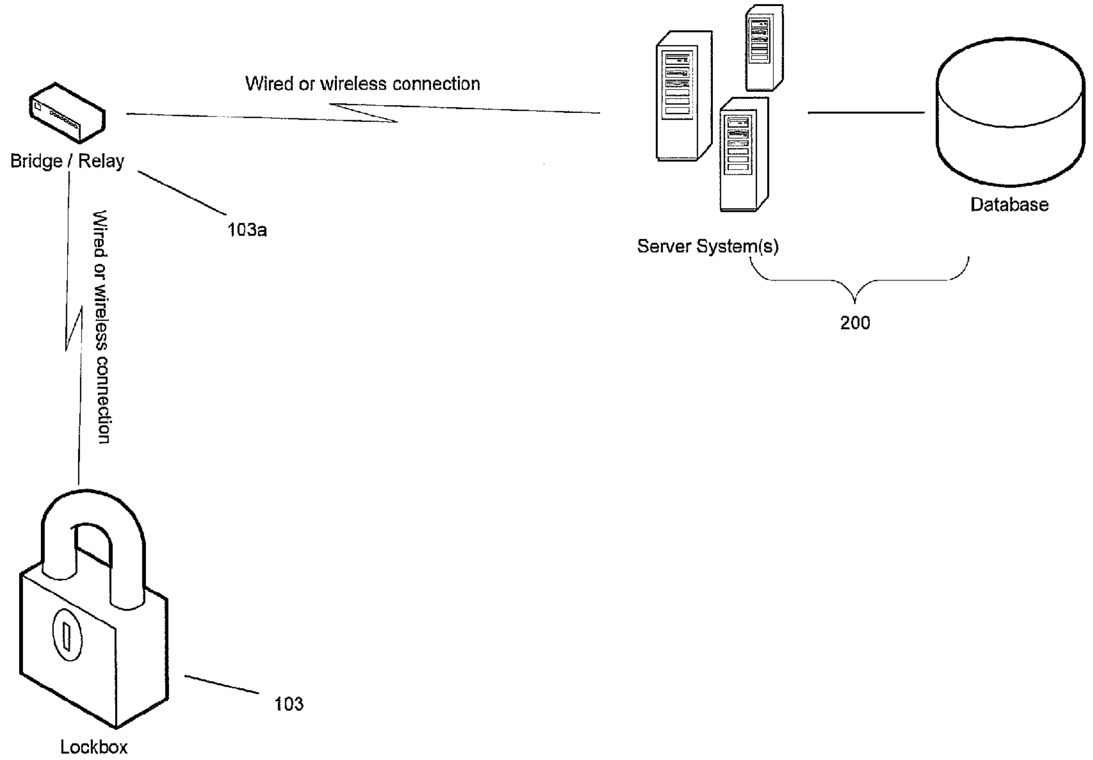
FIG. 7B depicts one embodiment of transmitting showing appointment data from the third party server system to the electronic lockbox, whereby the electronic lockbox is powered by a bridge/relay device (e.g., computer, wireless LAN access point, etc.)

Once the showing appointment data is stored on the third party system 200 it must be transmitted to the electronic lockbox 103 and/or the electronic key device 104. FIG. 7A shows one embodiment of transmitting the showing appointment data from the third party system 200 directly to the electronic lockbox 103 via a communications link. FIG. 7B shows another embodiment where the third party system 200 transmits the showing appointment data directly to the electronic lockbox 103 that has been assigned to the property for which the showing has been scheduled. However, in this embodiment, the electronic lockbox 103 is operatively coupled to, and potentially powered by, a powered bridge/relay device 103A, capable of receiving and transmitting data. The bridge/relay device 103A could be, for example, a computer, a wireless LAN access point, etc. The bridge/relay device 103A is operatively coupled to the electronic lockbox 103 via a wired or wireless communications link.

Figure 7C:
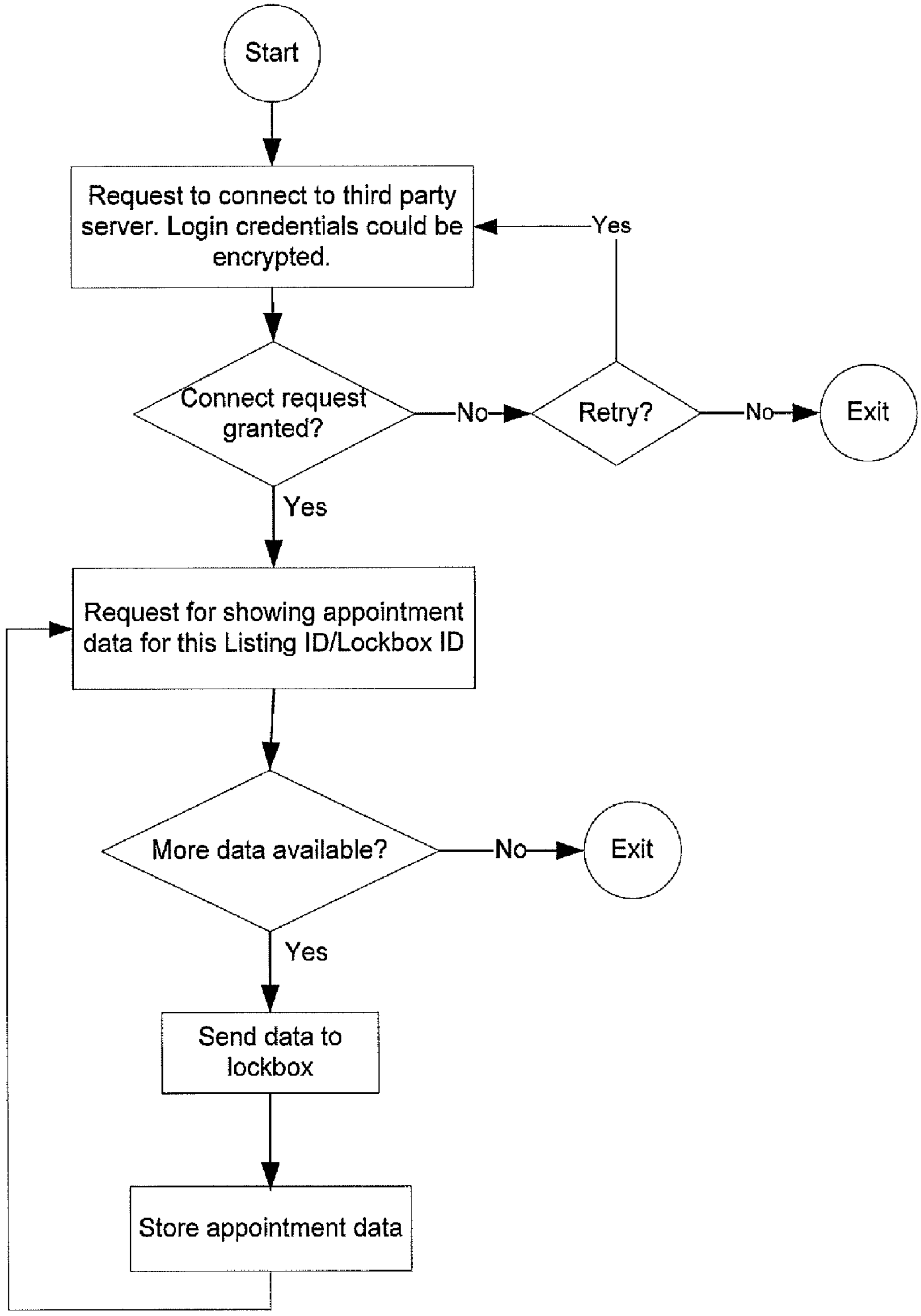
FIG. 7C depicts one embodiment of logic for transmitting showing appointment data from the third party server system to the electronic lockbox.

FIG. 7C shows a possible sequence of steps for transmitting showing appointment data from the third party system 200 directly to the electronic lockbox 103. Upon request, the electronic lockbox 103 establishes a connection to a server of the third party system 200. The electronic lockbox 103 then requests from the third party system 200 all showing appointment data for the property associated with the requesting electronic lockbox 103. The showing appointment data for the property associated with the electronic lockbox 103 is then transmitted from the third party system 200 to the electronic lockbox 103 via the communications link. The transmitted showing appointment data is then stored in a storage medium inside the electronic lockbox 103.

Figure 8A:
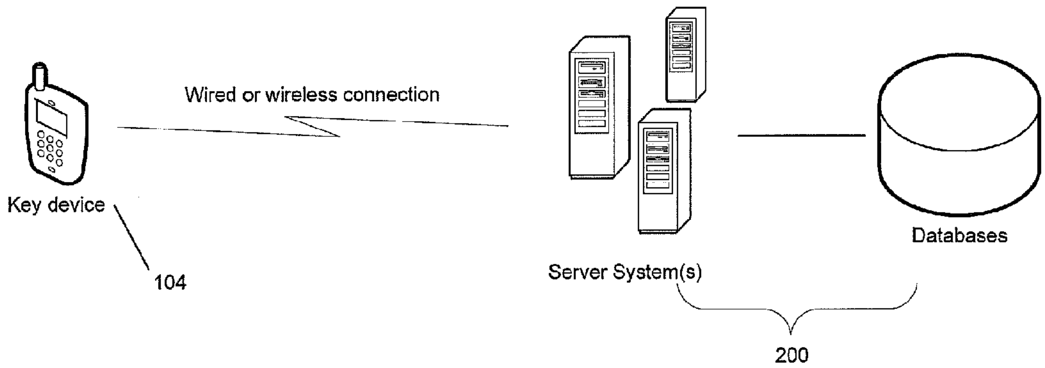
FIG. 8A depicts one embodiment of transmitting showing appointment data from the third party server system directly to the electronic key device.
Figure 8B:
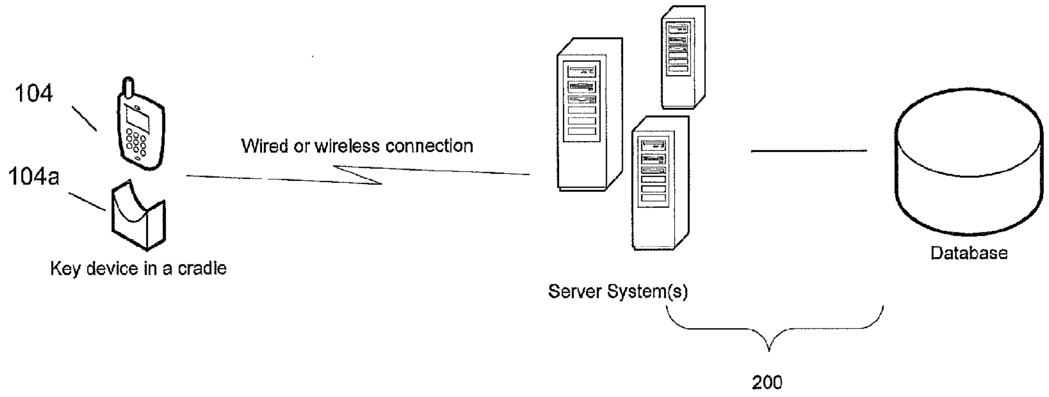
FIG. 8B depicts one embodiment of transmitting showing appointment data from the third party server system to the electronic key device coupled to a cradle device, whereby the cradle device may be a bridge/relay device.

FIG. 8A shows one embodiment of transmitting the showing appointment data from the third party system 200 directly to the electronic key device 104 via a communications link. FIG. 8B shows another embodiment where the third party system 200 transmits the showing appointment data directly to the electronic key device 104 that has been assigned to the showing agent who is scheduled to show the property to which the transmitted showing appointment data pertains to. However, in this embodiment, the electronic key device 104 is operatively coupled to a powered bridge/relay device 104A, which may also be capable of receiving and transmitting data. The bridge/relay device 104A is operatively coupled to the electronic key device 104 via a wired or wireless communications link.

Figure 8C:
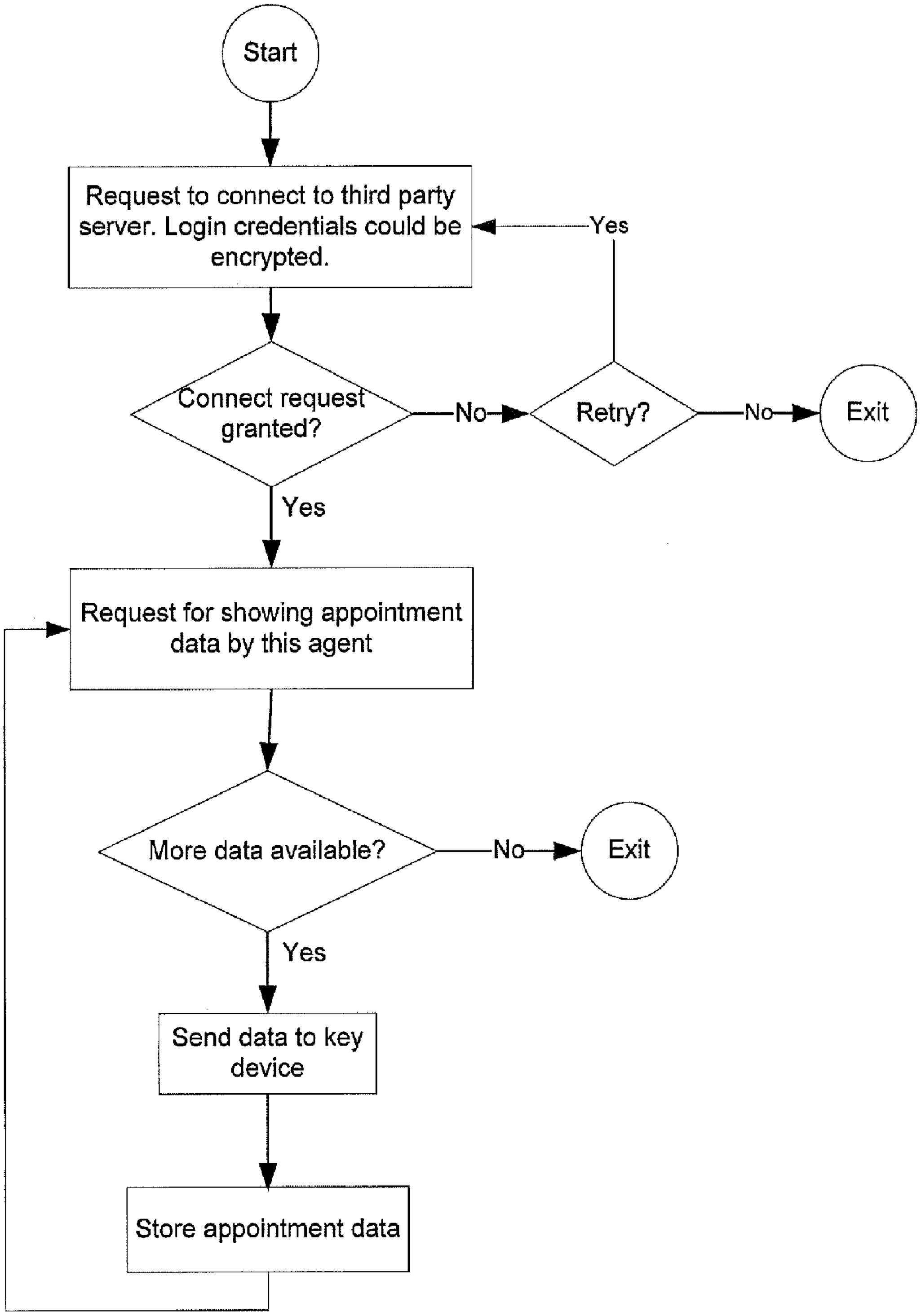
FIG. 8C depicts one embodiment of logic for transmitting showing appointment data from the third party server system to the electronic key device.

FIG. 8C shows a possible sequence of steps for transmitting showing appointment data from the third party system 200 directly to the electronic key device 104. Upon request, the electronic key device 104 establishes a connection to a server of the third party system 200. The electronic key device 104 then requests from the third party system 200 all showing appointment data for the property associated with the requesting showing agent using the electronic key device 104. The showing appointment data for the requesting showing agent is then transmitted from the third party system 200 to the electronic key device 104 via a communications link. The transmitted showing appointment data is then stored in a storage medium inside the electronic key device 104.

Controlling Lockbox Access

Figure 9:
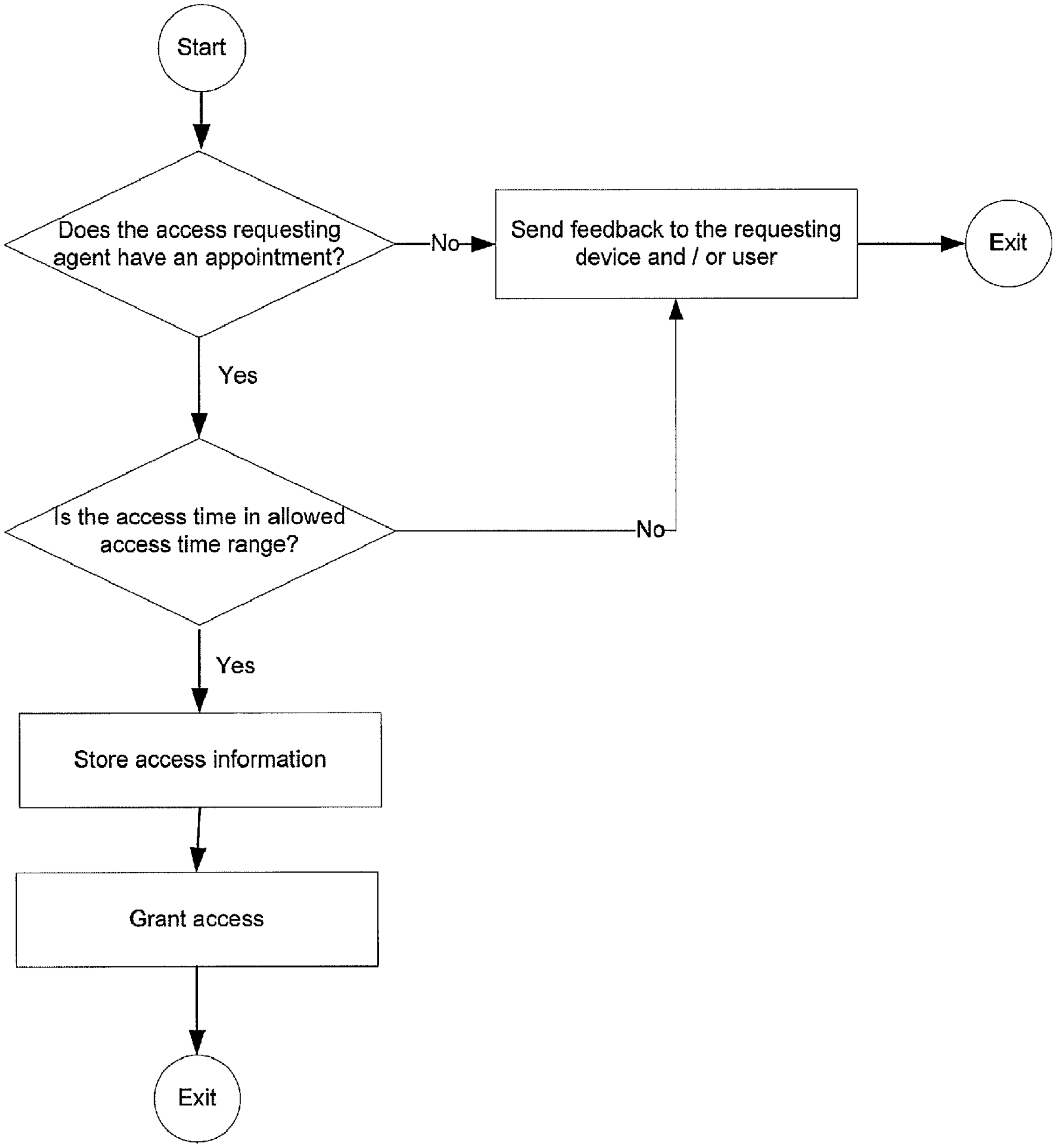
FIG. 9 depicts one embodiment of logic inside the electronic lockbox for controlling access when the showing appointment data is available at the electronic lockbox.

Once the showing appointment data is available at the electronic lockbox 103, the actual access to lockbox 103 is controlled by a logic executed inside the electronic lockbox 103. FIG. 9 shows a possible sequence of steps for controlling access when the showing appointment data is available at the electronic lockbox 103. In this embodiment, the logic inside the electronic lockbox 103 compares the current date and time of the internal timer and the Showing Agent ID of the showing agent attempting to access the lockbox 103 with the stored showing appointment data. As noted above, the showing appointment time comprises a time range/interval that may included a predetermined period of time before and after the actual showing appointment time as well as the Showing Agent ID of the showing agent for whom the appointment was made. In case the showing appointment was made for a plurality of showing agents or the showing management system has defined a team of showing agents, each of the corresponding Showing Agent IDs would also be included in showing appointment data. If the accessing Showing Agent ID and the current access time match the stored showing appointment data, the lockbox 103 will grant access.

Figure 10:
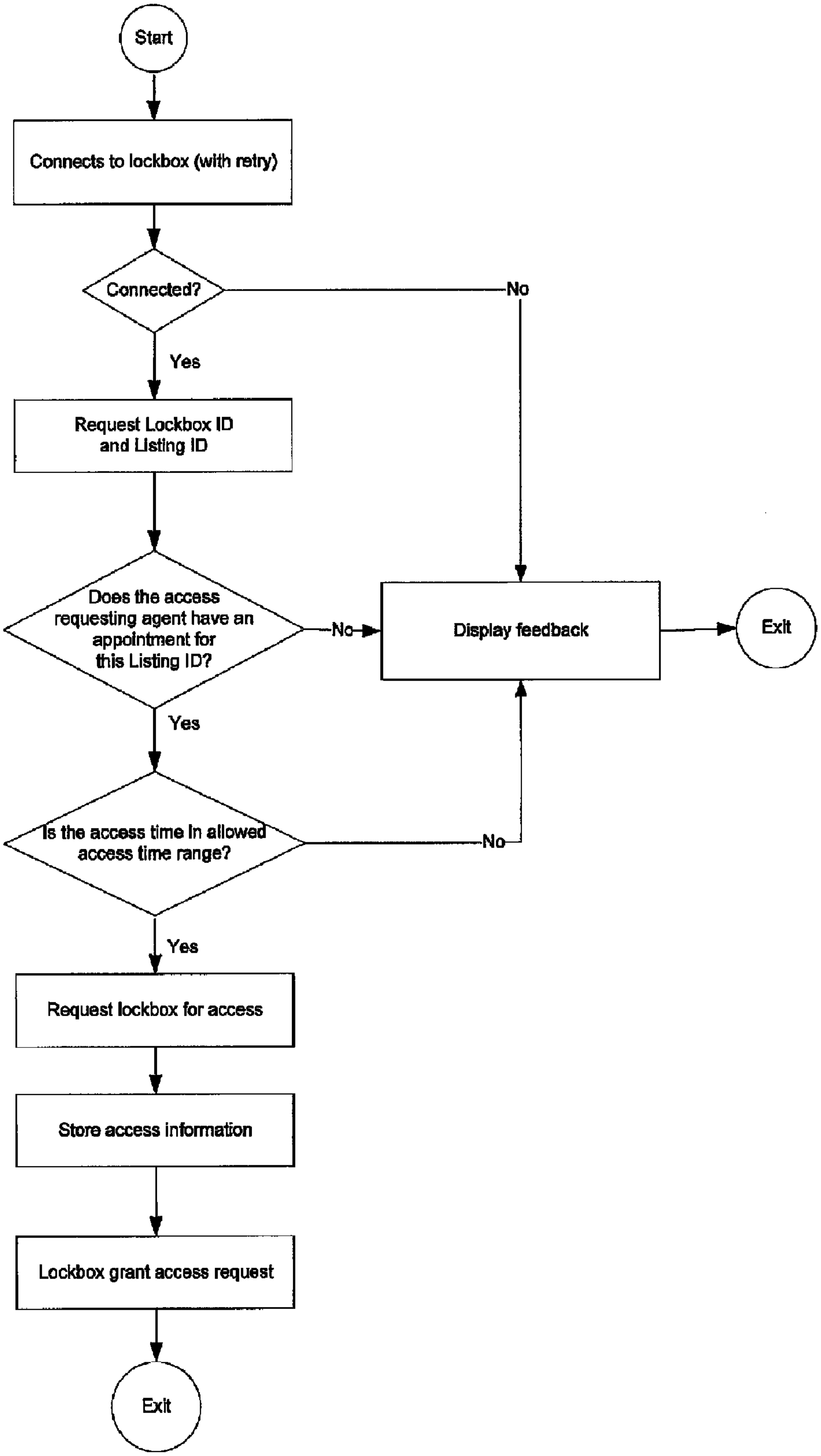
FIG. 10 depicts one embodiment of logic inside the electronic key device for controlling access when the showing appointment data is available at the electronic key device.

Alternatively, the showing appointment data may be available at the electronic key device 104. FIG. 10 shows an embodiment where the actual access to the lockbox 103 is controlled by logic executed inside the electronic key device 104. In this embodiment, the electronic key device 104 connects to the electronic lockbox 103 via a communications link. The key device 104 then determines the Lockbox ID and the Listing ID this particular lockbox is presently assigned to from data that is stored on a storage device inside the electronic lockbox 103. The logic inside the key device 104 then determines if the showing agent with a particular Showing Agent ID has a scheduled appointment for the Listing ID stored on the electronic lockbox 103 by comparing the Listing ID with the one that is part of the showing appointment data stored inside the key device 103. If the Listing ID matches, the logic inside the key device 104 compares the current date and time of the internal timer with the stored showing appointment data. As noted above, the showing appointment data comprises a time range/interval that may include a predetermined period of time before and after the actual showing appointment time as well as the Showing Agent ID of the showing agent for whom the appointment was made. In case the showing appointment was made for a plurality, i.e., team of showing agents, each of the corresponding Showing Agent IDs would also be included in showing appointment data. If the current access time matches the stored showing appointment time, the lockbox 103 will grant access.

Figure 11:
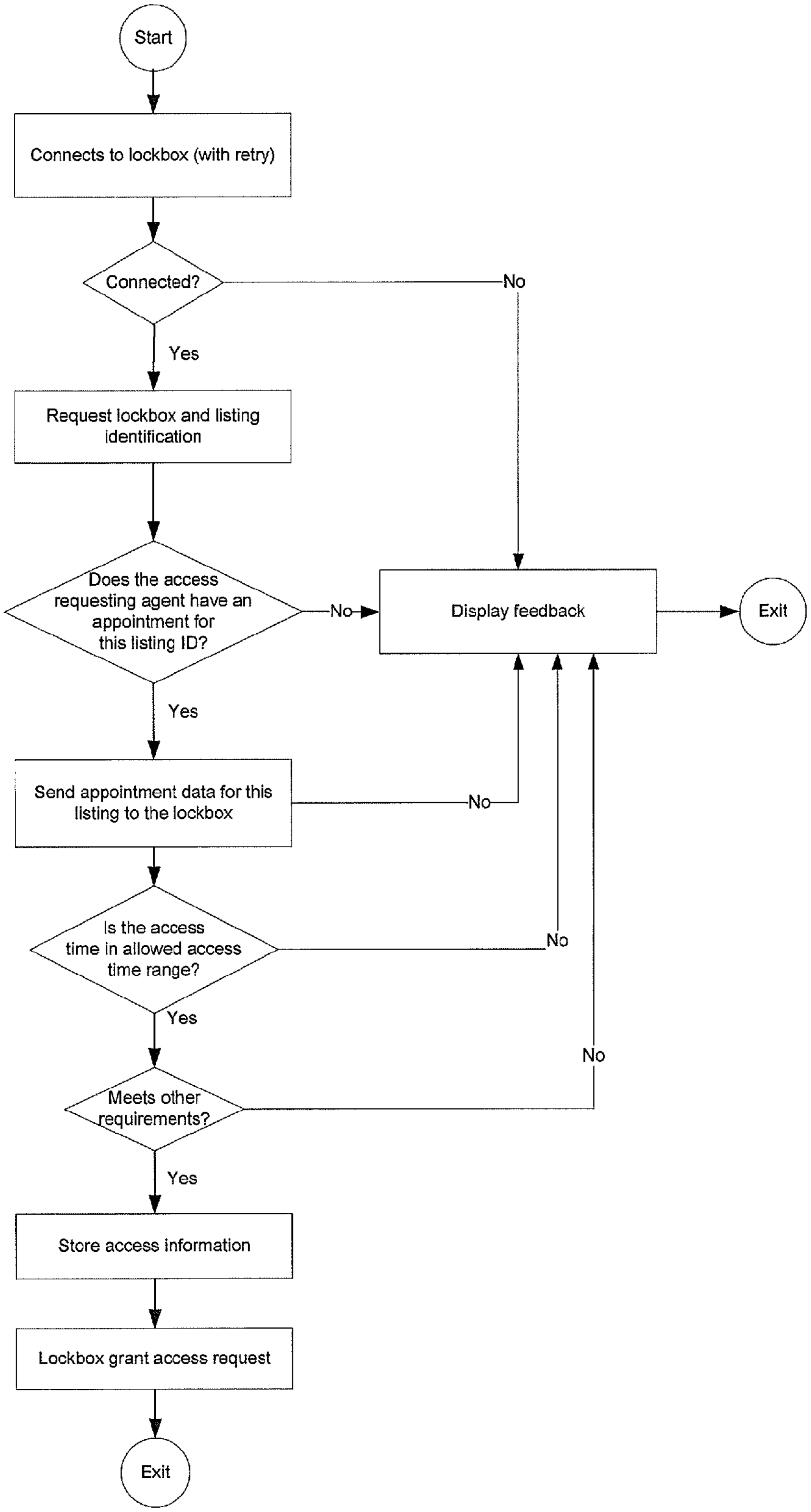
FIG. 11 depicts another embodiment of logic inside the electronic key device for controlling access when the showing appointment data is available at the electronic key device.

FIG. 11 shows another possible sequence of steps where the actual access to the lockbox 103 is controlled by logic executed inside the electronic key device 104. In this embodiment, the electronic key device 104 connects to the electronic lockbox 103 via a communications link. The key device 104 then determines the Lockbox ID and the Listing ID this particular lockbox is presently assigned to from data that is stored on a storage device inside the electronic lockbox 103. The logic inside the key device 104 then determines if the showing agent with a particular Showing Agent ID has a scheduled appointment for the Listing ID stored on the electronic lockbox 103, by comparing the Listing ID with the one that is part of the showing appointment data stored inside the key device 103. If the Listing ID matches, the key device 104 transmits the showing appointment data to the lockbox 103. Then, logic inside the lockbox 103 compares the current date and time of the internal timer with the showing appointment data. As noted above, the showing appointment data comprises a time range/interval that may include a predetermined period of time before and after the actual showing appointment time as well as the Showing Agent ID of the showing agent for whom the appointment was made. In case the showing appointment was made for a plurality, i.e., team of showing agents, each of the corresponding Showing Agent IDs would also be included in showing appointment data. If the current access time matches the stored showing appointment time, the lockbox 103 will grant access.

Time Synchronization

Figure 12:
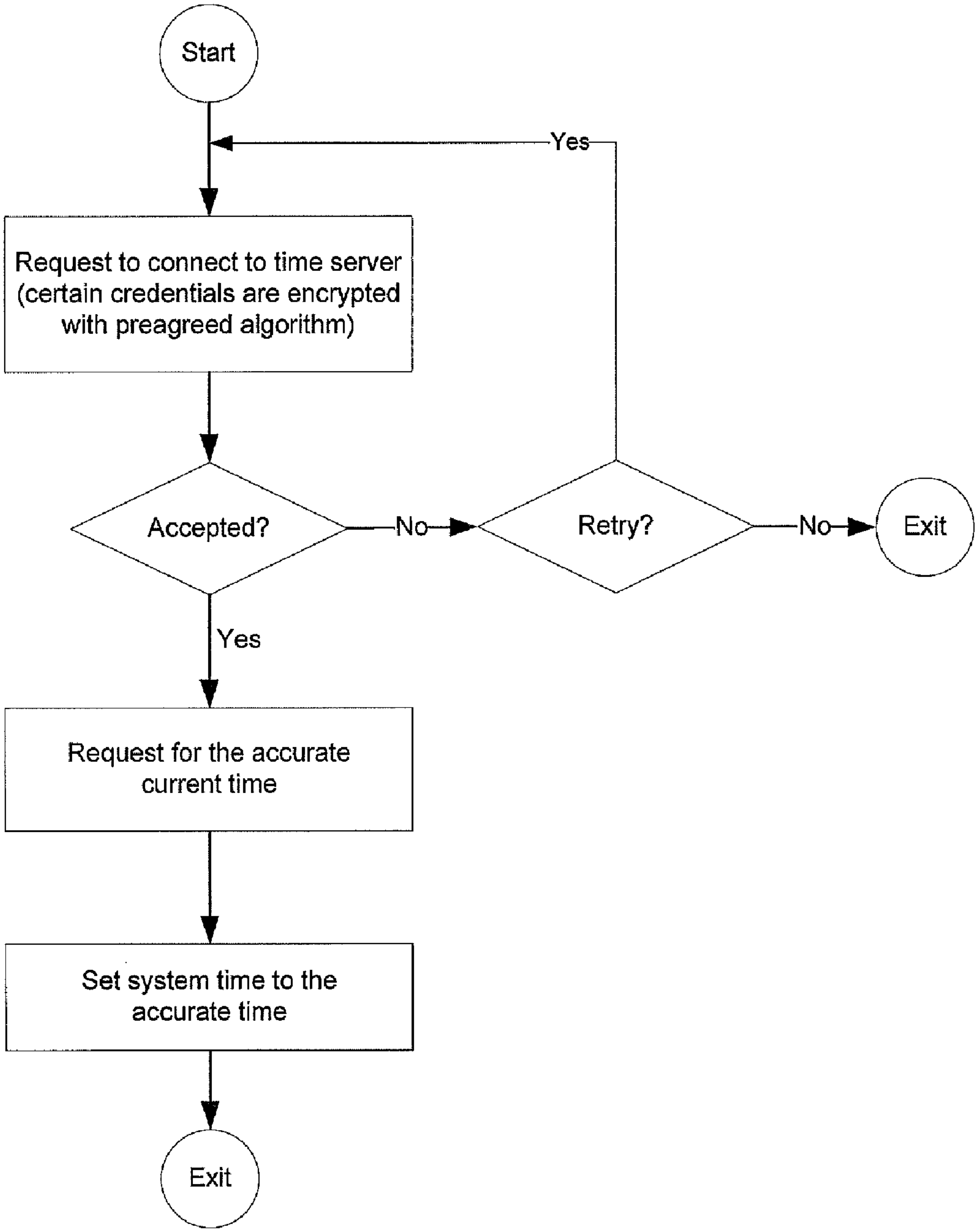
FIG. 12 depicts one embodiment of logic inside the electronic key device and/or the electronic lockbox for time synchronization of the device.

Reliable lockbox access control based on predetermined showing appointment data requires an accurate internal timer inside the electronic lockbox 103 and/or the electronic key device 104 to ensure that access is actually granted during the predetermines showing times. Systems and methods to synchronize internal timing devices are widely known in the art. FIG. 12 shows just one of many possible sequences of steps the electronic lockbox 103 and/or the electronic key device 104 may execute to synchronize their internal timers. In this embodiment, the electronic lockbox 103 and or the electronic key device 104 will establish a connection to a remote server via a communications link, whereby the remote server will synchronize the internal timer.

Matching Lockbox ID with Listing ID

The showing management system of this invention further programmatically matches a specific electronic lockbox with a specific Listing ID. As noted above, most electronic lockboxes are capable of storing access data, which may include, but are not limited to, Lockbox ID, Showing Agent ID, Access Date and Time, Listing ID, etc. However, electronic lockboxes are only temporarily "assigned" to a specific property, i.e., they are constantly moved from one listed property to the next and the seller's agent or listing office personnel is required to manually enter both the unique Lockbox ID and the Listing ID into the a database or other means of tracking the lockbox's location whenever it is moved to a new property. However, many times this manual assignment is not completed by the agents or listing offices resulting in an incomplete lockbox access data record. A lockbox access data record where the Listing ID is missing may be formatted as below:

| Access Event | Lockbox ID | Listing ID | Access Date | Access Time | Showing Agent Key ID | Showing Agent ID |
|---|---|---|---|---|---|---|
| L1 | 3453 | n.a. | Jan. 11, 2008 | 9:40 AM | 7655 | 566 |

Prior art showing management services, such as ShowingTime™'s ShowingDesk™ software (see U.S. Pat. No. 6,973,432) allows real estate professionals, especially listing and showing agents, to schedule an appointment for a showing. A typical showing appointment data record stored in the showing management system's database may contain, but is not limited to, the data fields shown in the table below.

| Listing ID | Showing Date | Showing Time | Showing Agent ID |
|---|---|---|---|
| 1234 | Jan. 4, 2008 | 9:45 AM | 566 |
| 1234 | Jan. 4, 2008 | 3:00 PM | 582 |

The showing management system of this invention compares available lockbox access records with the stored showing time appointment data records and programmatically matches a Listing ID to a Lockbox ID.

Optional Preprocessing of Imported Lockbox Access Records

In order to process the lockbox access records, they must be imported into the showing management system's database. In one embodiment the lockbox access records stored in the electronic lockboxes are transmitted via a communications link between the electronic lockbox and the showing management system's servers coupled to the showing management system's database. An imported lockbox access record from a particular electronic lockbox may look like the table below.

| Access Event | Lockbox ID | Listing ID | Access Date | Access Time | Showing Agent Key ID | Showing Agent ID |
|---|---|---|---|---|---|---|
| L1 | 3453 | 1234 | Jan. 11, 2008 | 9:40 AM | 7655 | 566 |
| L2 | 3453 | n.a. | Jan. 11, 2008 | 3:10 PM | 8224 | 582 |
| L3 | 3453 | n.a. | Jan. 12, 2008 | 11:12 AM | 7655 | 566 |
| L4 | 3453 | 1234 | Jan. 14, 2008 | 2:58 PM | 4357 | 226 |
| L5 | 3453 | 1234 | Jan. 15, 2008 | 10:05 AM | 7790 | 733 |

In the table above, recorded Access Events L2 and L3 do not list Listing IDs. If desired the showing management system may perform preprocessing of the lockbox access record of a particular lockbox (here: lockbox with Lockbox ID 3453) to automatically fill in the missing Listing ID. This is designed to cover either of two scenarios: (1) a user has inadvertently removed the assignment during the time period between events L1 and L4, or (2) the empty entries remain after other lockbox assignment steps described elsewhere in this disclosure have been done.

Figure 13:
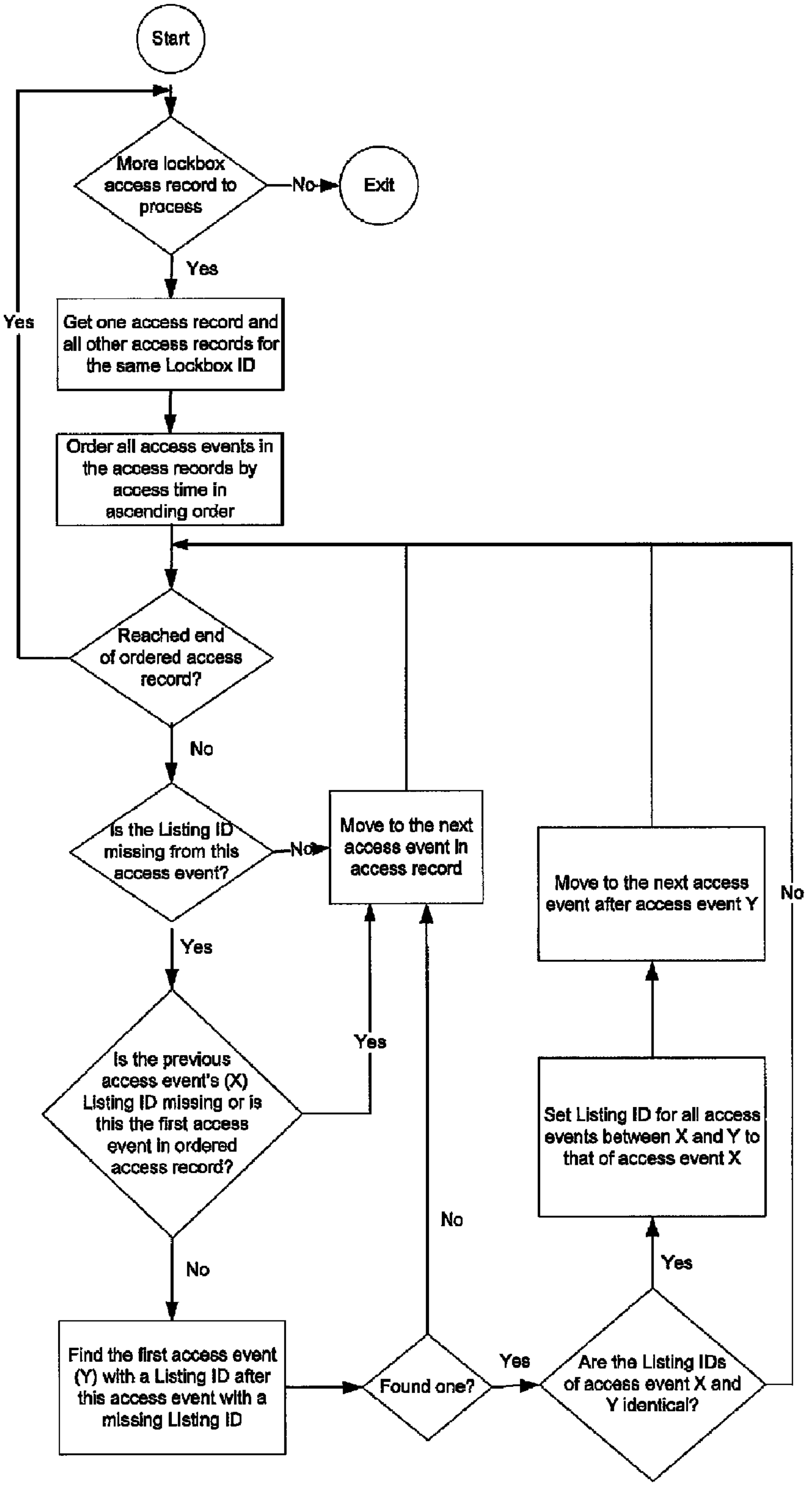
FIG. 13 depicts one embodiment of logic inside the showing management system for preprocessing data from an electronic lockbox.

The flowchart of FIG. 13 depicts one possible sequence of steps for preprocessing lockbox access records from a lockbox having a particular Lockbox ID. The showing management system gathers all available lockbox access records from one particular lockbox and orders all Access Events by Access Date and Access Time in ascending order. When an Access Event in the access record does not list a Listing ID, the logic will compare the Listing ID recorded for the previous Access Event (X) with the first available Listing ID in an access event (Y) after this incomplete Access Event. If the Listing ID of Access event X and Y are identical, the logic will set the Listing ID for all the incomplete Access Events between Access Event X and Y to that of Access Event X. Accordingly, in the example above, the showing management system's logic would automatically set the Listing ID for the Access Events L2 and L3 to 1234.

A similar preprocessing logic may also be used if a Listing ID in the lockbox access record is not missing, but appear to be erroneous or inconsistent. For example, Access Event L2 lists the Listing ID 1243, while the other Access Events list the Listing ID 1234.

| Access Event | Lockbox ID | Listing ID | Access Date | Access Time | Showing Agent Key ID | Showing Agent ID |
|---|---|---|---|---|---|---|
| L1 | 3453 | 1234 | Jan. 11, 2008 | 9:40 AM | 7655 | 566 |
| L2 | 3453 | 1243 | Jan. 11, 2008 | 3:10 PM | 8224 | 582 |
| L3 | 3453 | 1234 | Jan. 12, 2008 | 11:12 AM | 7655 | 566 |
| L4 | 3453 | 1234 | Jan. 14, 2008 | 2:58 PM | 4357 | 226 |

Here, the preprocessing logic would identify the Listing ID recorded for L2, i.e., 1243 as being inconsistent, by comparing all Listing IDs recorded in the given lockbox access record. In the event the preprocessing logic fails to deliver an obvious correction with high certainty, the showing management system will treat all inconsistent Listing IDs as if they were missing all together and will run this modified lockbox access record through the matching algorithm described below. The system will then compare the results of the matching algorithm with the original lockbox access record that contains the apparently inconsistent Lockbox IDs. If the matched Listing IDs are different from the original Lockbox IDs the showing management system will keep the Lockbox IDs that resulted from the matching algorithm.

Matching a Lockbox ID with a Listing ID

Figure 14:
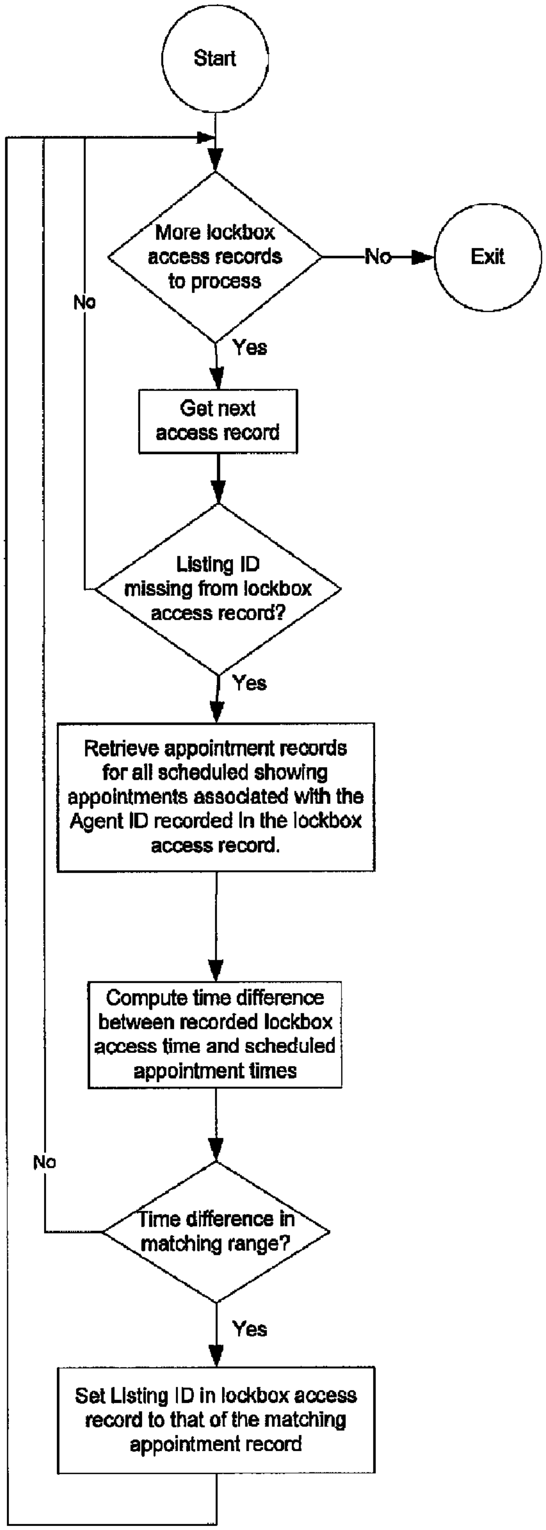
FIG. 14 depicts one embodiment of logic inside the showing management system for matching a lockbox ID with a Listing ID, when the Listing ID is missing from electronic lockbox access data records when the showing management system is processing a batch of electronic lockbox access data records.

FIG. 14 depicts one embodiment of logic inside the showing management system for matching a Lockbox ID with a Listing ID, when the Listing ID is missing from electronic lockbox access data records. For an Access Event without a Listing ID, the showing management system will analyze the Showing Agent ID, the Access Date and the Access Time recorded for that particular Access Event. The showing management system then retrieves the records for all scheduled showing appointments associated with the recorded Showing Agent ID from the showing management system's database. Next, the system will compute the time differences between the recorded lockbox Access Date and Access Time and the scheduled showing appointment times. If the Access Date/Access Time recorded for the particular Access Event fall within a scheduled showing appointment's start and end time, i.e., less than x minutes before the scheduled showing appointment's start time and less then y minutes after the scheduled showing appointment's end time, the showing management system will assign the Listing ID from this matching showing appointment to this Access Event. The value for x and y may be determined by an administrator of the showing management system, and may depend on many factors. When determining values for x and y, it is obvious that setting lower values for x and y may result in fewer but more accurate Listing ID matches, whereby higher values may yield more but less accurate matches.

The logic of FIG. 14 is further explained in the following example. The following table contains a number of scheduled showing appointments.

| Showing Appt. | Showing Date | Showing Time | Showing Agent ID | Listing ID |
|---|---|---|---|---|
| A1 | Jan. 11, 2008 | 3:00 PM | 582 | 1234 |
| A2 | Jan. 11, 2008 | 3:30 PM | 566 | 5678 |
| A3 | Jan. 11, 2008 | 4:00 PM | 244 | 1234 |
| A4 | Jan. 11, 2008 | 5:30 PM | 868 | 1234 |

Imported lockbox access records from different lockboxes, where the Listing ID was not recorded or is missing may look like this:

| Access Event | Access Date | Access Time | Showing Agent ID | Lockbox ID | Listing ID |
|---|---|---|---|---|---|
| L1 | Jan. 11, 2008 | 3:10 PM | 582 | 9001 | n.a. |
| L2 | Jan. 11, 2008 | 3:15 PM | 566 | 9002 | n.a. |
| L3 | Jan. 11, 2008 | 3:50 PM | 244 | 9001 | n.a. |
| L4 | Jan. 11, 2008 | 5:31 PM | n.a. | 9001 | n.a. |

For these sets of data, it is likely that the lockbox with the Lockbox ID 9001 is assigned to Listing ID 1234 and Lockbox ID 9002 is assigned to Listing ID 5678.

The following examples will illustrate the application of the matching logic shown in FIG. 14. First, Showing Appointment A1 for the showing of the property with the Listing ID 1234 was set for 3:00 PM for the showing agent with ID 582. According to the lockbox Access Event L1, Agent ID 582 was accessing Lockbox ID 9001 at 3:10 PM. Since the lockbox access by Agent ID 582 occurred at about the same time as the appointment was scheduled, i.e., 10 minutes late, it is likely that the showing agent was accessing the property with the Listing ID 1234 using the lockbox with the Lockbox ID 9001. Furthermore, for this same reason it is unlikely that the other lockboxes in this exemplary lockbox access record match with Listing ID 1234 or that any other Listing ID is associated with Lockbox ID 9001.

Second, Showing Appointment A2 for the showing of the property with the Listing ID 5678 was set for 3:30 PM for the showing agent with ID 566. According to the lockbox Access Event L2, Agent ID 566 was accessing Lockbox ID 9002 at 3:15 PM. Since the lockbox access occurred by Agent ID 566 at about the same time as the appointment was scheduled, i.e., 15 minutes early, it is likely that the showing agent was accessing the property with the Listing ID 5678 using the lockbox with Lockbox ID 9002. Furthermore, for this same reason it is unlikely that the other lockboxes in this exemplary lockbox access record match with Listing ID 1234 or that any other Listing ID is associated with Lockbox ID 9002.

Third, Showing Appointment A3 was set for a 4:00 PM showing of Listing ID 1234 by the agent having Agent ID 244. According to the lockbox Access Event L3, Agent ID 244 was accessing Lockbox ID 9001 at 3:50 PM. Since the lockbox access occurred by the agent having Agent ID 244 at about the same time as the appointment was scheduled, i.e., 10 minutes early, it is likely that the agent was accessing the property with the Listing ID 1234 using the lockbox with Lockbox ID 9001. Furthermore, for this same reason it is unlikely that the other lockboxes match Listing ID 1234 or that any other Listing ID is associated with Lockbox ID 9001.

Finally, this logic is also capable to determine the Showing Agent ID for a recorded Access Event, should that data be absent from the record. In the table above, the Showing Appointment A4 for a showing of Listing ID 1234 by Agent ID 868 was set for 5:30 PM. According to the lockbox Access Event L4, Lockbox ID 9001 was accessed by an unidentified showing agent at 5:31 PM. Since the lockbox access occurred at about the same time as the appointment was scheduled, i.e., 1 minute late, it is likely that the showing agent that was accessing the lockbox was the showing agent with Showing Agent ID 868 and that the associated property has the Listing ID 1234.

Improved Matching

While the aforementioned matching algorithm is easy to implement and is reasonably efficient, there is no guarantee that the matches generated by the algorithm are correct. For example, in the likely case where multiple showings occur simultaneously, and multiple fields are uncertain, the above algorithm will not generate accurate matches. Therefore, another aspect of this invention is the use of an improved matching algorithm incorporating statistical methods to generate an acceptable level of confidence. Cumulative probabilities for a standard normal distribution table are shown in FIG. 17.

Figure 15:
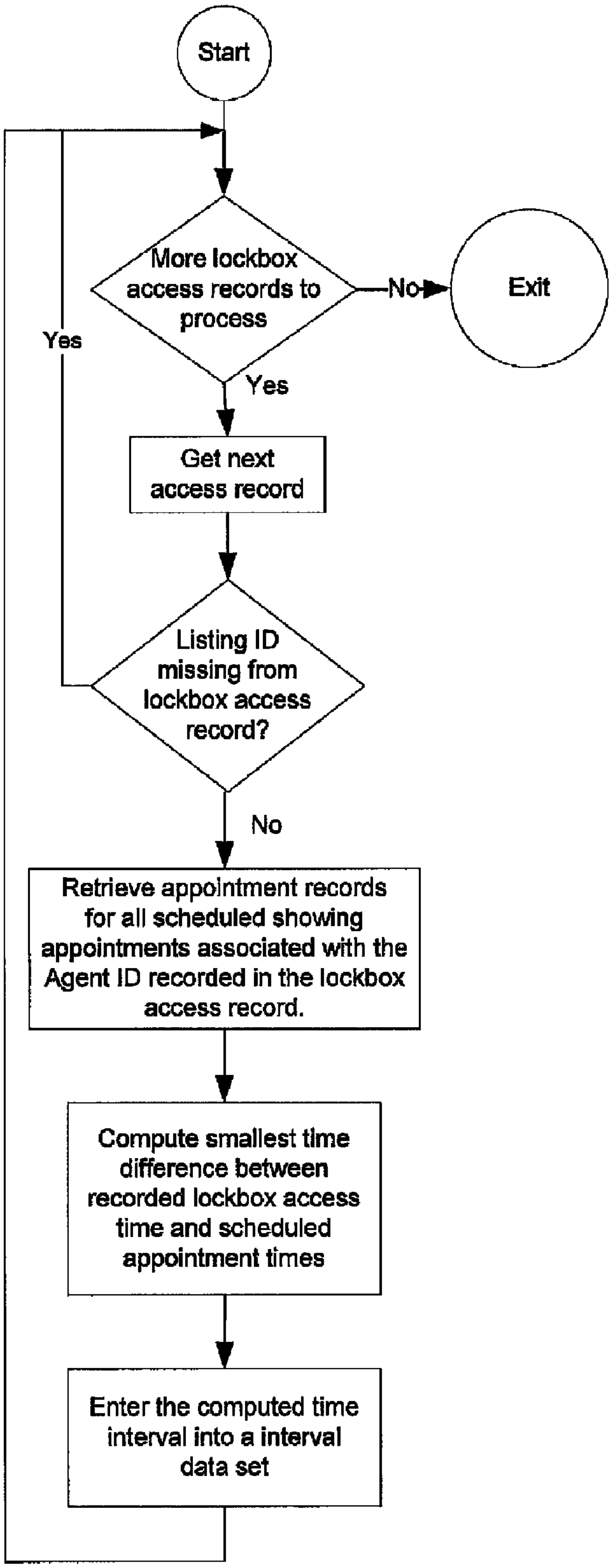
FIG. 15 depicts one embodiment of logic inside the showing management system to determine values for an approximately normal distribution by computing time intervals.
Figure 16:
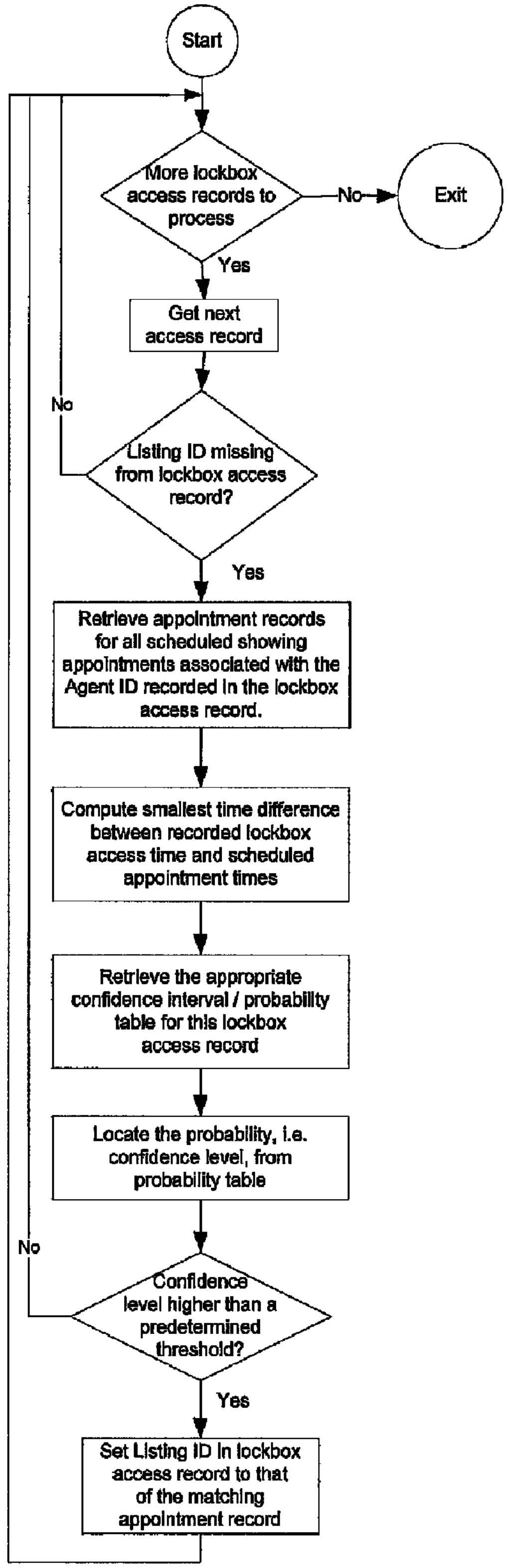
FIG. 16 depicts one embodiment of logic for matching Listing ID and Lockbox ID using a predetermined confidence level.

FIG. 15 depicts one embodiment of logic for matching a Listing ID with a Lockbox ID by establishing a "normal distribution." For an Access Event without a Listing ID, the showing management system will analyze the Showing Agent ID, the Access Date and the Access Time recorded for that particular Access Event. The showing management system then retrieves all scheduled showing appointments associated with that Showing Agent ID for the same date as the recorded Access Date with the missing Listing ID. Next, the system will compute the smallest time difference between the recorded lockbox Access Date/Access Time and all scheduled showing appointments for that particular Showing Agent ID on that particular Access Date.

When calculating the time difference/interval, the following algorithm is applied. When the recorded lockbox Access Time is before the scheduled appointment's start time, then the appointment start time is subtracted from the lockbox Access Time. When the recorded lockbox Access Time is after a scheduled appointment's end time, the appointment's end time is subtracted from the recorded lockbox Access Time. When the recorded lockbox Access Time is between the appointment's start and end time, then the time interval is set to 0 (zero). The smallest time intervals are then entered into a new interval data set. This interval data set is approximately a normal distribution.

Figure 18:
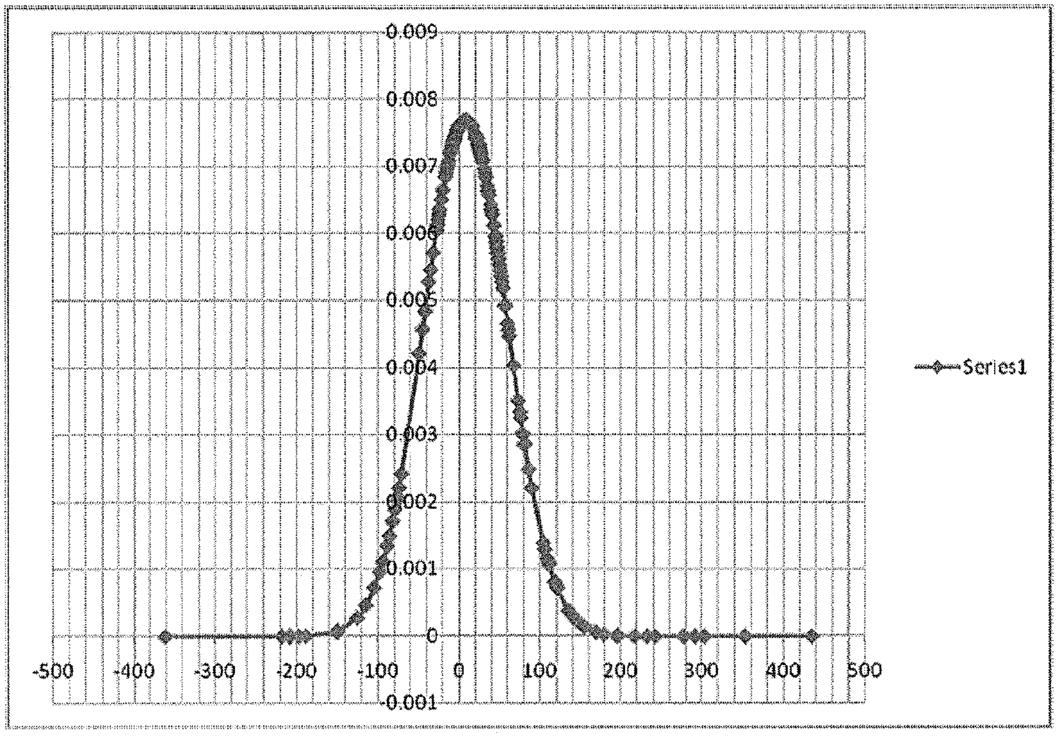
FIG. 18 depicts a probability density graph based on a given set of data.

FIG. 18 is a graph depicting a probability density curve demonstrating the approximately normal distribution based on a given set of data. Here, the given set of data includes a mean of m=7.965079365, and a standard deviation of s=51.93862147, whereby the horizontal axis shows the smallest time intervals in minutes.

Let X stand for the normal random variable of these intervals, whose values are this data set and P stand for the cumulative probability. By utilizing the technique of standardizing a normal distribution, $Z=(X-m)/s$, and the table of Cumulative Probabilities for a Standard Normal Distribution (see FIG. 17), we can establish the relationship between confidence intervals and probabilities. The following small table lists several value pairs of this relationship. A more refined table with many more entries or a formula approach may be used in an actual implementation.

| Confidence interval mathematical representation | Confidence interval value representation in minutes | Probability or confidence level |
|---|---|---|
| m ± 0.667 * s | −26.67798116 to 42.60813989 | 50% |
| m ± 1.0 * s | −43.97354211 to 59.90370084 | 68% |
| m ± 1.645 * s | −77.47395295 to 93.40411168 | 90% |
| m ± 1.96 * s | −93.83461872 to 109.7647774 | 95% |
| m ± 2.58 * s | −126.036564 to 141.9667228 | 99% |

For example, one value from the above computed data set is 90 minutes. In the table above, the smallest range the value 90 falls in is −77.47395295 to 93.40411168. Accordingly, we can say that we are 90% confident that the match between the lockbox access record and showing appointment record is accurate. FIG. 26 depicts one embodiment of logic to match a Listing ID with a Lockbox ID and to determine the confidence level of the accuracy of the match.

To further enhance the accuracy of the matches it should further be considered that the approximate normal distribution curve's properties, mean and standard deviation may vary based on the underlying data set. There are many approaches to utilize this technique. One way is to categorize the lockbox access records by real estate agency offices, groups of offices (based on specific criteria, such as, for example, geographical location, real estate professional association, etc.), all offices, or other criteria. After having computed the mean and standard deviation for each category, it is applied to lockbox access records with missing Listing IDs that belong to the same category.

Matching Based on Multiple Showing Agents

The aforementioned matching is based on only one lockbox access record. By itself, this can be inaccurate and/or impossible to use for matching. For example, the disclosed matching algorithm cannot be used at all or will be highly inaccurate if: 1) there are no showing appointments in the showing management's database that are associated with the Showing Agent ID recorded in the lockbox access record, 2) even the smallest computed time difference between the recorded lockbox Access Date/Access Time and all scheduled showing appointments for that particular Showing Agent ID on that particular Access Date is still too large (i.e., outside the normal distribution), or 3) some other irregularity occurs. Such an incomplete lockbox access record prior to matching efforts may look like this:

| Access Event | Access Date | Access Time | Showing Agent ID | Lockbox ID | Listing ID |
|---|---|---|---|---|---|
| L1 | Jan. 11, 2008 | 9:29 AM | 582 | 9001 | n.a. |
| L2 | Jan. 12, 2008 | 4:00 PM | 566 | 9001 | n.a. |

Based on the aforementioned matching, different Listing IDs might be determined for these two Access Events. These two Access Events are presented as an example. There might be multiple records from the same Lockbox ID. When different Listing IDs are found for access records for the same Lockbox ID, there are two scenarios. First, the Access Events are timely ordered:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 15, 2008 | 4:00 PM | 54 | 3453 | 234 |
| L4 | Jan. 16, 2008 | 4:00 PM | 434 | 3453 | 234 |
| L5 | Jan. 17, 2008 | 4:00 PM | 543 | 3453 | 456 |

For example, the lockbox access record above contains Listing IDs 123, 234 and 456. If the access events are grouped by Listing IDs, these subgroups are in timely sequential order. It can be assumed that the match is accurate and that the lockbox with Lockbox ID 3453 was indeed used on different properties (i.e., was associated with different Listing IDs).

In the second scenario the Access Events in a lockbox access record are not timely ordered:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 13, 2008 | 4:00 PM | 54 | 3453 | 234 |
| L4 | Jan. 16, 2008 | 4:00 PM | 434 | 3453 | 234 |
| L5 | Jan. 17, 2008 | 4:00 PM | 543 | 3453 | 456 |

Note that in the example above Access Event L3 is not in timely order. There are many possible ways to process these "noise" cases and a variety of factors to consider, whereby the results can vary dramatically. One possible way to approach these "noise" cases is to consider the computed confidence level for each matching. When in conflict, the match with highest computed confidence level should overwrite possible matches with lower confidence levels. For example, if the computed confidence level for Access Event L2 is 87% and the computed confidence level for Access Event L3 is only 13%, then it is far more accurate if the system assigns Listing ID 123 to Access Event L3 instead of Listing ID 234.

Utilizing Historic Lockbox Access Data to Improve Matching Accuracy

The showing management system may not have available all lockbox access data when performing the disclosed matching algorithm. This may be the case when the lockbox access data are not promptly transmitted to the showing management system. Therefore the matching algorithm may be performed repeatedly to improve the matching accuracy. Each time the algorithm is performed, it will have available more lockbox access data for processing than before. Accordingly, the more historic lockbox access data are available for processing, the more accurate the resulting matches are and it will be possible to assign most of the lockboxes (i.e., Lockbox IDs) to Listing IDs without having to rely on a constant availability of up to date lockbox access data.

The Showing Agent is not the Agent who Scheduled the Showing Appointment

According to the disclosed matching algorithm, a recorded Access Event should match a scheduled showing appointment for the accessed property (i.e., Listing ID). However, there may be instances where the showing agent is not the same agent for whom a showing appointment was scheduled. In other words, a showing agent with a Showing Agent ID different from the one that was scheduled access the lockbox. There are two possible scenarios.

First, the Access Event is the intended showing of the appointment. In this case, the accessing showing agent and the agent for whom the showing appointment was made form a team. A team may consist of two or more members and the team members can represent each other in the sense of scheduling appointments and showing properties. The information that a plurality of agents with different respective Showing Agent IDs are a team can be provided by the respective agents, offices, brokerage, MLS or other entities. The showing management system is further capable of defining and managing teams of showing agents. To allow for accurate matching in cases like this, the disclosed matching algorithm must be able to treat a plurality of different Showing Agent IDs as one, when processing lockbox access records and showing time appointment records. The algorithm is required to be resilient to this situation. It does so by cumulatively building the probability prior to the final assignment.

Second, the Access Event is not the intended showing of the appointment. In this case, the disclosed matching algorithm cannot produce a match. However, the "Refine lockbox data process" described below, could assign a Listing ID to this lockbox Access Event.

Repeated Matching

It is very likely that the result of a matching process is not accurate. For example, one result might look like what is described in the following table, assuming any "noise" or conflicts have been resolved.

| Access Event | Lockbox ID | Listing ID | Access Date | Access Time | Confidence Level of Match |
|---|---|---|---|---|---|
| L1 | 3453 | 123 | Jan. 3, 2008 | 11:29 AM | Listing ID present |
| L2 | 3453 | 123 | Jan. 3, 2008 | 2:00 PM | 0.9 |
| L3 | 3453 | n.a. | Jan. 10, 2008 | 2:00 PM | 0 (no match) |
| L4 | 3453 | 234 | Jan. 18, 2008 | 1:00 PM | 0.7 |
| L5 | 3453 | 234 | Jan. 20, 2008 | 3:00 PM | 0.8 |
| L6 | 3453 | 456 | Jan. 24, 2008 | 4:00 PM | Listing ID present |

Ratings can be established on a result of a matching process. One rating may be the sum of these confidence levels. In this example, the rating would be 0.9+0.0+0.7+0.8=2.4. The next table is the result of a subsequent matching process.

| Access Event | Lockbox ID | Listing ID | Access Date | Access Time | Confidence Level of Match |
|---|---|---|---|---|---|
| L1 | 3453 | 123 | Jan. 3, 2008 | 11:29 AM | Listing ID present |
| L2 | 3453 | 123 | Jan. 3, 2008 | 2:00 PM | 0.9 |
| L3 | 3453 | n.a. | Jan. 10, 2008 | 2:00 PM | 0 (no match) |
| L4 | 3453 | 234 | Jan. 18, 2008 | 1:00 PM | 0.7 |
| L5 | 3453 | 456 | Jan. 20, 2008 | 3:00 PM | 0.9 |
| L6 | 3453 | 456 | Jan. 24, 2008 | 4:00 PM | Listing ID present |

In this case, the rating for this matching process is 0.9+0.0+0.7+0.9=2.5. When comparing the two ratings, i.e., 2.4 and 2.5, the rating of 2.5 is higher and the system should accept the matching results of the matching process with the higher rating.

Improved Rating for Match Results

In the last two tables above, the Access Date of Access Event L5 is closer to the Access Date of L4 than to the Access Date of L6. The match ratings are further improved by assigning a bigger weight to the matching results of the first table. There are many different ways to assign weights. One possible way is 1/n, whereby n is the sum of 1 and the number of days between the Access Event of the matched Access Event and the previous or subsequent Access Event, whichever is closer. If the previous or subsequent Access Event doesn't have the same Listing ID as the matched Access Event, then n is set to a fixed number. The appropriate value for n may be the number of unassigned lockboxes in the set of possible lockboxes. In this example, the value for n is n=365. Based on this improvement, the new ratings would be 0.9*1/1+0.0+0.7*1/365+0.8*1/3=1.168584 and 0.9*1/1+0.0+0.7*1/365+0.85*1/5=1.071918. Based on this adjusted rating, the result of the first matching is a better one.

No Scheduled Showing Appointment Data

There may be a recorded lockbox Access Event though no showing appointment was scheduled. This is particularly common on vacant properties. Since there is no scheduled showing appointment for the lockbox, the lockbox cannot be assigned to the property/Listing ID.

Refine Lockbox Access Data Processing

Before the lockbox access records are run through the disclosed matching algorithm, the records may look like this:

| Access Event | Access Date | Access Time | Showing Agent ID | Lockbox ID | Listing ID |
|---|---|---|---|---|---|
| L1 | Jan. 13, 2008 | 9:29 AM | 566 | 3453 | n.a. |
| L2 | Jan. 14, 2008 | 4:00 PM | 765 | 3453 | n.a. |
| L3 | Jan. 13, 2008 | 4:00 PM | 54 | 3453 | n.a. |
| L4 | Jan. 16, 2008 | 4:00 PM | 434 | 3453 | n.a. |
| L5 | Jan. 17, 2008 | 4:00 PM | 543 | 3453 | n.a. |

After the matching, the records may look like the following table. This pattern may be repeated for a large set of records. Here Access Events L1, L4 and L5 are now assigned to the same Listing ID.

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | n.a. |
| L3 | Jan. 13, 2008 | 4:00 PM | 54 | 3453 | n.a. |
| L4 | Jan. 16, 2008 | 4:00 PM | 434 | 3453 | 123 |
| L5 | Jan. 17, 2008 | 4:00 PM | 543 | 3453 | 123 |

In this refinement process, the Listing ID 123 was assigned to Access Events L2 and L3. The "refinement" logic may be similar to the one shown in FIG. 23 (i.e., Preprocessing of lockbox access data).

| Access Event | Access Date | Access Time | Showing Agent ID | Lockbox ID | Listing ID |
|---|---|---|---|---|---|
| L1 | Jan. 13, 2008 | 9:29 AM | 566 | 3453 | 123 |
| L2 | Jan. 14, 2008 | 4:00 PM | 765 | 3453 | 123 |
| L3 | Jan. 13, 2008 | 4:00 PM | 54 | 3453 | 123 |
| L4 | Jan. 16, 2008 | 4:00 PM | 434 | 3453 | 123 |
| L5 | Jan. 17, 2008 | 4:00 PM | 543 | 3453 | 123 |

Team Matching

In instances where a plurality of showing agents, i.e., a showing agent team, is assigned to a particular Listing ID, the disclosed logic and matching algorithms may also be used to assure correct matching of Listing ID and Showing Agent IDs. Like matching individual Showing Agent IDs with a Listing ID, the showing management system would use the same available showing appointment data and imported lockbox access records. The disclosed algorithms and methods to improve the matching accuracy would be applied repeatedly to account for members joining or leaving a team. The matching results may also be used for controlling the access to an electronic lockbox.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated.

It is intended that the scope of the invention not be limited by the specification, but be defined by the claims set forth below.

What is claimed is:

1. A method for assigning a lockbox to a real property comprising the steps of:

attaching said lockbox physically to said real property;

scheduling a showing appointment for said real property using a showing management system, said showing management system generating a record based on said showing appointment, said record comprising a showing time period, at least one unique showing agent identifier for at least one showing agent of a plurality of showing agents and an identifier for said real property;

storing said record in a showing appointment database operatively associated with said showing management system and containing a plurality of scheduled showing appointments;

accessing said lockbox and recording each access event in an access record, each of said access events comprising an access time, a unique showing agent identifier corresponding to the accessing showing agent and a lockbox identifier corresponding to said lockbox;

communicating said access record to said showing management system;

retrieving from said showing appointment database all the scheduled showing appointments for said recorded showing agent identifier and computing a matching one of said showing appointments in which said recorded access time falls within said scheduled showing time period; and assigning the real property identifier associated with said matching showing appointment to said lockbox, whereby said matching showing appointment is updated by adding said lockbox identifier to said lockbox access record.

2. The method of claim 1 wherein said showing time period comprises a start time and one of a duration and an end time.

3. The method of claim 1 further comprising the step of defining a team of showing agents, said team comprising one or more showing agent identifiers, and wherein said step of scheduling includes scheduling a showing appointment for at least one team.

4. The method of claim 1, wherein said lockbox is an electronic lockbox.

5. The method of claim 4 wherein said electronic lockbox comprises:

a battery;

an accurate timer coupled to and powered by said battery;

a locking mechanism coupled to and powered by said battery;

an external communications port coupled to and powered by said battery;

a storage device coupled to and powered by said battery;

a microcontroller coupled to and powered by said battery and also coupled to said accurate timer, said locking mechanism, and said external communications port, wherein said microcontroller stores said access record in said storage device and transmits said access record to said showing management system using said external communications port.

6. A method for associating a plurality of lockboxes with a plurality of real properties comprising the steps of:

attaching each of said lockboxes physically to a particular real property;

logging a plurality of access events associated with each of said lockboxes in an access record, said access events each comprising an access time, a unique showing agent identifier corresponding to the accessing showing agent, and a lockbox identifier corresponding to said lockbox;

communicating said plurality of access events to a showing management system;

for each access event within said plurality of access events, associating said access event with a showing appointment record, said showing appointment record including at least a real property identifier corresponding to a particular real property, an access time, and a unique showing agent identifier corresponding to the accessing showing agent, wherein said step of associating includes matching the access time in said access event with the access time in said showing appointment record and matching the unique showing agent identifier in said access event with the unique showing agent identifier in said showing appointment record, wherein said step of associating further includes stochastically calculating a probability that a particular lockbox identifier is associated with a particular real property identifier based on said step of matching; and associating a particular lockbox identifier with a particular real property identifier when said probability exceeds a predetermined value.

7. The method of claim 6, wherein at least a portion of said lockboxes are electronic lockboxes comprising:

a battery;

an accurate timer, coupled to and powered by said battery;

a locking mechanism, coupled to and powered by said battery;

a storage device coupled to and powered by said battery;

a wireless communications port, coupled to and powered by said battery; and a microcontroller, said microcontroller coupled to said accurate timer, said locking mechanism, said storage device, and said wireless communications port, wherein said microcontroller receives said showing time period through said wireless communications port from said showing management system, and allows said locking mechanism to open only during said time period based on said accurate timer, and wherein said microcontroller stores said access record in said storage device, and wherein said method further comprises the step of:

transmitting said access record to said showing management system using said wireless communications port.

* * * * *